United States Patent
Boczek

(10) Patent No.: US 9,530,066 B2
(45) Date of Patent: Dec. 27, 2016

(54) EAR-SCAN-BASED BIOMETRIC AUTHENTICATION

(71) Applicant: Descartes Biometrics, Inc., Blaine, WA (US)

(72) Inventor: Michael Boczek, Blaine, WA (US)

(73) Assignee: Descartes Biometrics, Inc, Blaine, WA (US)

( * ) Notice: Subject to any disclaimer, the term of this patent is extended or adjusted under 35 U.S.C. 154(b) by 0 days.

(21) Appl. No.: 14/567,984

(22) Filed: Dec. 11, 2014

(65) Prior Publication Data

US 2015/0161459 A1 Jun. 11, 2015

Related U.S. Application Data

(60) Provisional application No. 61/914,880, filed on Dec. 11, 2013.

(51) Int. Cl.
*G06K 9/00* (2006.01)

(52) U.S. Cl.
CPC .................. *G06K 9/00885* (2013.01)

(58) Field of Classification Search
CPC ........ G06K 9/00885; G06K 9/00; G06F 3/041
USPC ....................................................... 382/115
See application file for complete search history.

(56) References Cited

U.S. PATENT DOCUMENTS

| 2006/0140453 | A1* | 6/2006 | Geng | G06K 9/00885 |
| | | | | 382/115 |
| 2014/0099992 | A1* | 4/2014 | Burns | H04M 1/605 |
| | | | | 455/550.1 |

OTHER PUBLICATIONS

Chen et al: "Human ear recognition in 3D", IEEE, 2007.*

* cited by examiner

*Primary Examiner* — Ruiping Li
(74) *Attorney, Agent, or Firm* — Olympic Patent Works PLLC

(57) ABSTRACT

The current document is directed to an ear-scan-based biometrics subsystem that is incorporated into any of a wide variety of processor-controlled devices, including mobile phones. The biometrics subsystem collects touch-point locations, device-orientation-representative angles, and, in certain implementations, additional data during each ear scan and uses the collected information to derive additional data that is stored with the collected data to generate a stored data representation of the ear scan. A first ear scan can be compared to a second ear scan to generate a matching score from weighted scores obtained from the touch-point locations and derived data, device-orientation-representative angles, and additional data within the stored data representations of the first and second ear scans. Ear-scan matching provides a basis for authentication of users and for compiling ear-scan profiles for users.

20 Claims, 36 Drawing Sheets

| | | 5.3 | 102 | 8.2 | 136 | 15 | 109 | 17 | 114 | 16.2 | 79 | 20.4 | 95 |
|---|---|---|---|---|---|---|---|---|---|---|---|---|---|
| -5.3 | 282 | | | 4.8 | 174 | 9.8 | 112 | 11.8 | 119 | 11.5 | 68 | 15.1 | 93 |
| -8.2 | 316 | -4.8 | 354 | | | 8.7 | 83 | 9.9 | 96 | 13.7 | 48 | 15.2 | 74 |
| -15 | 289 | -9.8 | 292 | -8.7 | 263 | | | 2.4 | 150 | 8.2 | 11 | 6.7 | 63 |
| -17 | 294 | -11.8 | 299 | -9.9 | 276 | -2.4 | 330 | | | 10.2 | 2 | 7 | 43 |
| -16.2 | 259 | -11.5 | 248 | -13.7 | 228 | -8.2 | 191 | -10.1 | 182 | | | 9.1 | 151 |
| -20.4 | 275 | -15.1 | 273 | 15.2 | 74 | -6.7 | 243 | -7 | 223 | -9.1 | 331 | | |

| | x | y | p | A | | |
|---|---|---|---|---|---|---|
| ① | 10.8 | 6.0 | 3.0 | 2.1 | | |
| ② | 9.7 | 11.2 | 6.1 | 2.6 | | |
| ③ | 4.9 | 11.7 | 3.6 | 2.1 | | |
| ④ | 6.0 | 20.3 | 1.7 | 2.5 | | |
| ⑤ | 3.9 | 21.5 | 7.7 | 3.6 | | |
| ⑥ | 14.0 | 21.9 | 8.4 | 2.2 | | |
| ⑦ | 9.0 | 26.3 | 4.2 | 2.3 | | |

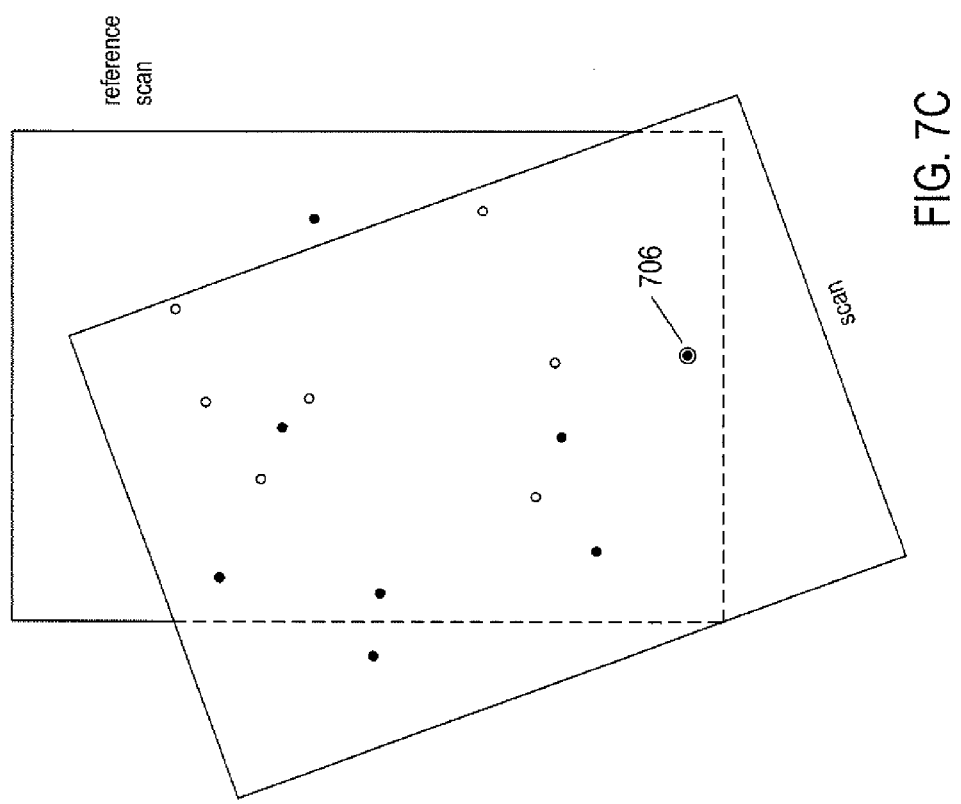

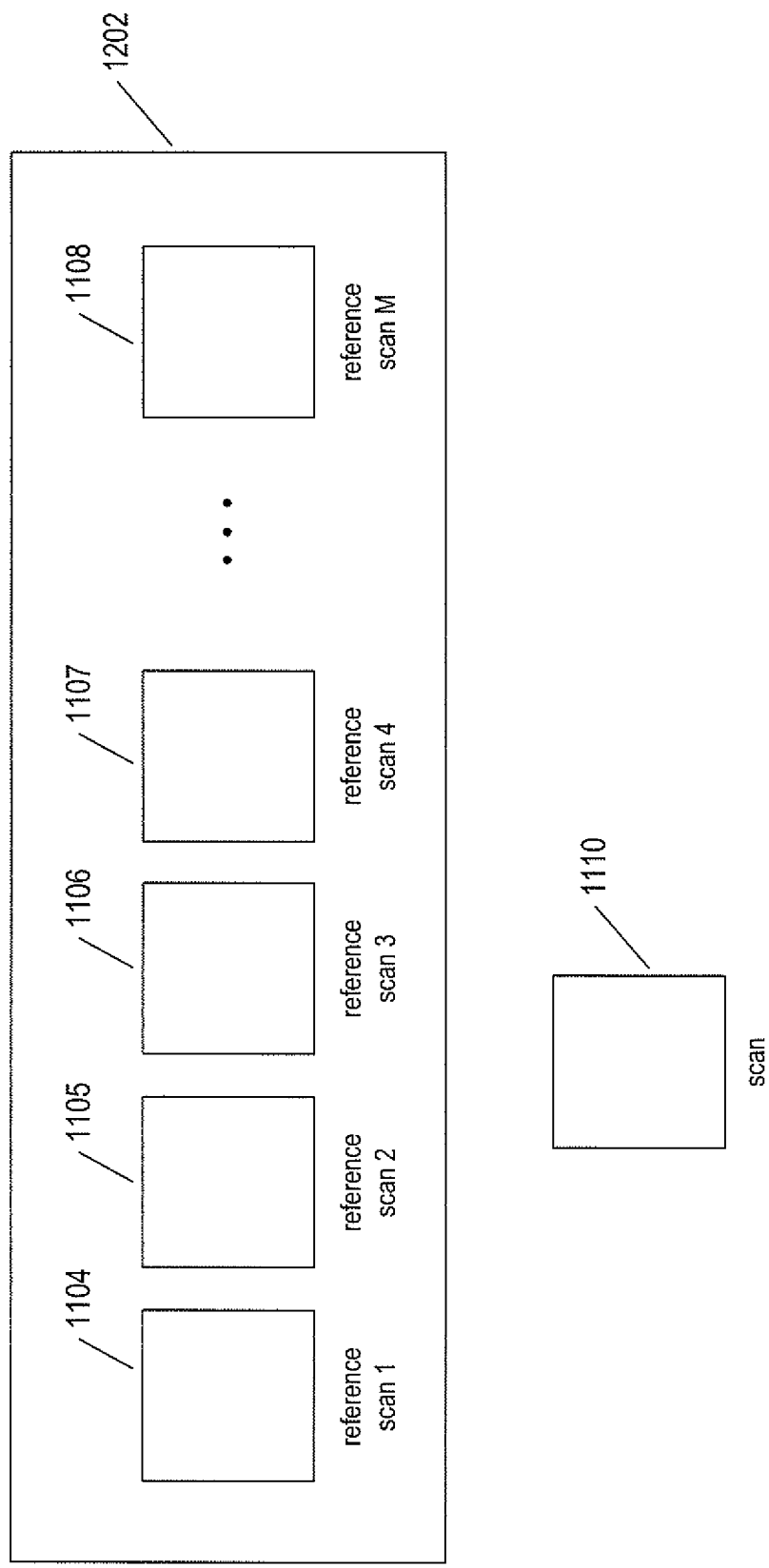

EAR-SCAN-BASED BIOMETRIC AUTHENTICATION

CROSS-REFERENCE TO RELATED APPLICATION

This application claims the benefit of Provisional Application No. 61/914,880, filed Dec. 11, 2013.

TECHNICAL FIELD

The present disclosure is related to device and resource security and, in particular, to methods and biometrics subsystems for automatically identifying a user attempting to use or access a device or resource by using one or more ear scans.

BACKGROUND

In an increasingly mobile society, where access to banking and business applications over a personal smart phone, tablet, or laptop is commonplace, personal identification and authentication have emerged as a global imperative. Although financial transactions and access to financial resources represent one well understood and appreciated vulnerability that can be exploited by criminals and criminal organizations, many other types of computational resources are associated with dangerous vulnerabilities, including access to classified information, control systems, and data-communications systems. Traditionally, an individual establishes his or her identity to humans or automated systems using passports, identity cards passwords and/or personal identification numbers ("PINS"), and providing access to biometrics scans. Unfortunately, serious deficiencies are associated with current identity-establishing documents, information, and technologies. Documents and other physical identity establishing entities can be lost, duplicated, or stolen. Pins and passwords can be easily forgotten, observed, intentionally or unintentionally shared with others, and discovered by determined hackers. These deficiencies have caused major issues for individuals, corporations, and many other organizations. Individuals are generally concerned with identity theft and privacy. Corporations and other organizations may have similar concerns, but are also concerned with theft of data, intellectual property, and trade secrets due to the proliferation of bring-your-own-device ("BYOD") policies and concomitant vulnerabilities in network security. Both individuals and organizations recognize the dangerous vulnerabilities to shared infrastructure and other resources attendant with widespread Internet connections, ever-increasing automation and computer control, and rapidly increasing capabilities and sophistication of criminals, criminal organizations, hackers, and terrorists. For all of these reasons, individuals and organizations continue to seek reliable technologies for controlling access to computers and computational resources so that only authenticated and authorized individuals are provided access.

SUMMARY

The current document is directed to an ear-scan-based biometrics subsystem that is incorporated into any of a wide variety of processor-controlled devices, including mobile phones. The biometrics subsystem can be called or invoked by an operating system, other control programs, and application programs in order to control access to the device, to control access to components and subsystems of the device, and to control access to computational resources, including stored data and application programs. The biometrics subsystem collects touch-point locations, device-orientation-representative angles, and, in certain implementations, additional data during each ear scan and uses the collected information to derive additional data that is stored with the collected data to generate a stored data representation of the ear scan. A first ear scan can be compared to a second ear scan to generate a matching score from weighted scores obtained from the touch-point locations and derived data, device-orientation-representative angles, and additional data within the stored data representations of the first and second ear scans. Ear-scan matching provides a basis for authentication of users and for compiling ear-scan profiles for users.

BRIEF DESCRIPTION OF THE DRAWINGS

FIGS. 6A-B illustrate the total operating-system-provided and derived data collected and derived by the biometrics subsystem to represent an ear scan.

FIGS. 7A-E illustrate a general approach to determining how closely the pattern of touch points in an ear scan match the pattern of touch points of a reference ear scan.

FIG. 12 illustrates the data used to authenticate a computational-device user by the biometrics subsystem.

DETAILED DESCRIPTION

Figure 1:
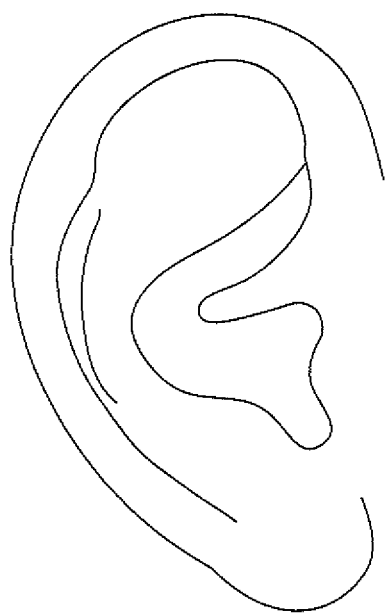
FIGS. 1-3 illustrate the data-capture process that occurs during a touch-screen-based ear scan.

The current document discloses a biometrics subsystem, and methods incorporated in the biometrics subsystem, that provides ear-scan-based authentication of human processor-controlled-device users. The disclosed biometrics subsystem verifies an individual's identity before the individual is provided access to a device or computational resource. An individual's identity is verified by combining collecting and storing information during a touch-based scan of the individual's ear, including the positions and relative positions of points on the surface of the ear that touch a touch-sensitive display screen or other pressure-detecting, contact-detecting, or proximity-detecting panel, screen, or scanner. In the described implementation, ear-scan data is obtained from the touch-sensitive display screen of a mobile phone along with additional mobile-phone sensors via the mobile-phone operating system. Similar biometrics can be implemented for a wide variety of other types of processor-controlled devices and systems.

The ear biometrics used by the disclosed implementation offer the robustness and reliability of fingerprinting with the ease of use found in voice recognition systems, but without the limitations and deficiencies associated with these technologies. An ear impression is as unique as a fingerprint and remains a stable and enduring biometric that does not significantly change as an individual ages. The convenience of ear biometrics for mobile device security is not easily matched—an individual user simply lifts the device to his or her ear and presses the ear to the touch screen to authenticate himself or herself to the biometrics subsystem. Authentication may unlock the device, provide access to an application program, provide access to the Internet or other communications subsystems and media, and provide access to stored data, device subsystems, and device components. The biometrics subsystem can be invoked or called by any of many computational entities, including the device operating system, other control programs, or application programs, depending on the particular implementation.

Biometrics is the science of identifying or verifying an individual's identity by the individual's physiological and behavioral characteristics or traits. Biometrics is a rapidly evolving technology found not only in forensic science but also in a broad range of civilian applications. Biometrics is finding greater acceptance in technology applications as a form of identity management and access control.

There are currently five leading biometrics marketed for technology applications: face, iris, fingerprinting, voice, and ear. Of the five, ear biometrics presents the most promising features for the mobile-device market when considering cost, convenience, robustness, and reliability. Facial recognition is hindered by the ever-changing nature of expressions, cosmetics, hairstyles, facial hair and the unreliability of light and shadow on the target setting. Fingerprint and iris recognition technology are the most widely used and well-known biometrics. They have a long history of accepted and proven reliability with law enforcement, but have some practical limitations. Most notably, fingerprints and iris images are expensive to capture, store, retrieve and compare, which explains why they tend to be used by law enforcement, large organizations, and in high-end devices. In addition, only moderate skill is needed to lift a fingerprint, or acquire fingerprint information, from the surface of a mobile device or another surface and subsequently use the lifted fingerprint to defraud fingerprint-security features. Voice and speech-recognition technologies have progressed rapidly in recent years, appearing in a broad range of devices, from Bluetooth headsets and phones to automobiles. While voice recognition is natural, intuitive, and non-distracting, voice recognition suffers from a number of practical limitations. Voice-recognition systems need to be trained to understand and recognize a user's unique speech pattern, cannot generally be used in noisy environments, and is easily overheard by others in the vicinity.

The ear is as unique as a fingerprint, less invasive than an iris scan, as natural and intuitive to use as voice recognition, and cost effective, because hardware and software components of current mobile phones provides sufficient capabilities for carrying out accurate and reliable ear scans.

The disclosed implementation is built on the unique biometric traits of an individual's ear. Area, radius, and pressure data is collected when an individual's ear makes contact with a Smartphone's touch screen. The length and angle of an individual's arm and forearm and the corresponding movements made by a user when lifting a phone is an additional biometric sufficiently unique to individuals to provide the basis for identification. The disclosed implementation obtains, in addition to the locations of touch points where the ear contacts a touch screen, information characterizing the orientation of the mobile phone in three-dimensional space relative to the local vertical direction.

In particular, the current document is directed to a biometric authentication method and subsystem that employs a touch-screen scan of the external morphology of a user's ear to authenticate a user of a computational device, such as a cell phone or other processor-controlled device with a touch-sensitive screen or panel. When the ear scan matches a stored profile of previously captured ear scans, the authentication method and subsystem recognizes the ear scan as having been carried out on the ear of a user matching the stored profile of ear scans. The currently described biometric authentication method and subsystem may be called or invoked within the power-up and resumption-of-operation processes carried out by the computational device, start-up processes of particular application programs, or at other points at which access to the computational device, as a whole, or to resources within the computational device, such as application programs, needs to be controlled to provide access only to authenticated users.

Figure 2:
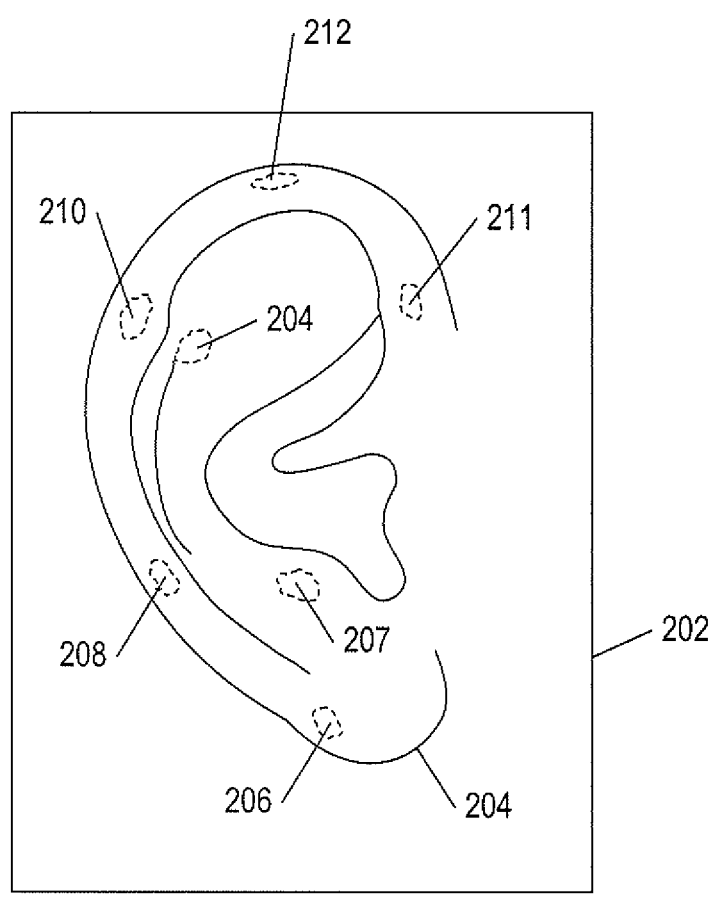
Figure 3:
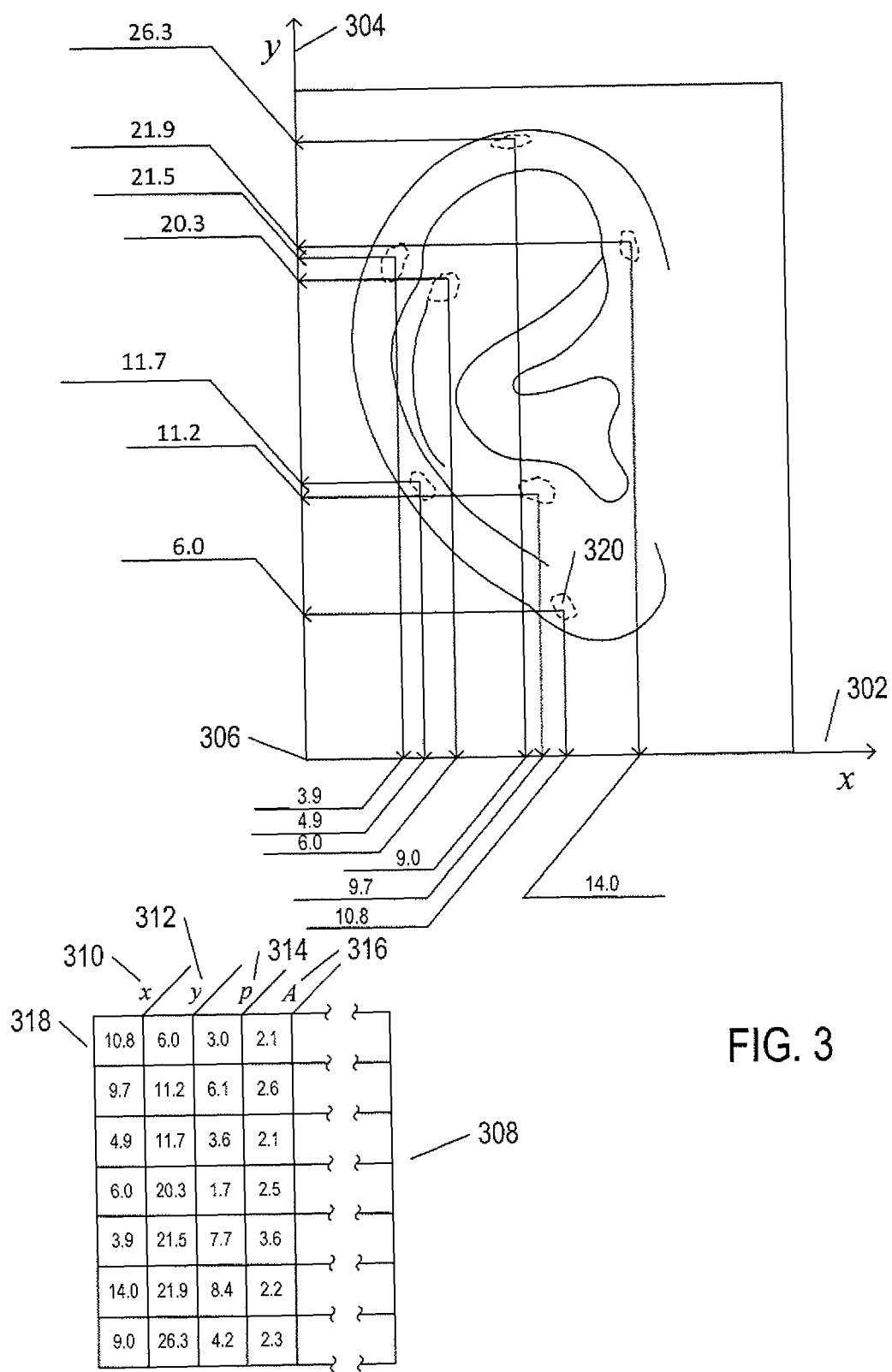

FIGS. 1-3 illustrate the data-capture process that occurs during a touch-screen-based ear scan. FIG. 1 shows a line drawing of a user's ear. FIG. 2 shows a touch-screen or other touch-sensitive sensor panel 202 placed by a user against the user's ear 204. In FIG. 2, the users ear 204 is on the far side of the touch screen 202 and is viewed through the touch screen. The ear is viewed from the perspective of the computational device that includes the touch screen. When a user places the touch screen of a mobile phone, as one example, against the user's ear, the user's ear touches the touch screen at a generally relatively small number of locations 206-212. These are shown as small areas with dashed-line boundaries. Normally, biological tissue, such as human ears, are relatively compliant and pliable and, even when lightly touched to the touch screen, slightly deform so that a small area of the surface of the ear is in contact with the touch screen at each location.

As shown in FIG. 3, a mobile-phone operating system or operating system of another type of computational device that supports a touch screen can be requested to produce ear-scan data within a small period of time following detection of touching of the screen. In other words, the operating system captures data for the locations at which an ear touches a touch screen very quickly, within milliseconds of an initial sensing of the ear coming in contact with the touch-sensitive display screen. It is desirable, for reproducibility, that the data capture occur quickly, before too many touch points are detected, reorientation of the touch screen with respect to the ear, and other such occurrences that can deleteriously effect ear-scan quality.

The operating system generally creates touch-point data based on a planar Cartesian-coordinate system superimposed over the touch screen. For example, as shown in FIG. 3, the touch screen is defined, in the current example, to inhabit the first quadrant of a planar Cartesian-coordinate system with the x axis 302 coincident with the lower horizontal edge of the touch screen, the y axis 304 coincident with the left-hand edge of the touch screen, viewed from the device perspective, and the origin at the intersection of the x and y axes 306. The operating system generally selects a single point for each small touch area. The single point may represent a centroid or moment of the area, a maximum-pressure point within the area, or may be located based on any of various other criteria.

Table 308 in FIG. 3 represents the data furnished by the operating system to the biometrics subsystem. Each row in the table corresponds to a touch location. For each touch location, the operating system provides an x coordinate 310, a y coordinate 312, and, in certain cases, a number representing contact pressure integrated over the area 314 and a number representing the area of the touch-location region 316. Thus, for example, the first row 318 of the table includes the (x,y) coordinates for touch point 320 as well as a pressure value and area value. In some cases, only the (x,y) coordinates are provided by an operating system, while, in other cases, an operating system may provide one or more of a pressure value, area value, and other types of computed metrics or measured values corresponding to a touch point.

FIGS. 4A-E illustrate derivation of a distance-orientation matrix by the biometric subsystem from the touch-point data returned by the operating system during an ear scan. FIGS. 4A-E all use the same illustration conventions, next described with reference to FIG. 4A. The top of the figure includes an n×n matrix 402, where n is the number of touch points recognized during the ear scan. Each element of the array, such as element 404, includes a first value 406 that indicates a distance and a second value 408 that indicates an angle measure. An element of the matrix in row i and column j includes the distance from touch point i to touch point j and the direction of the vector, in degrees, from touch point i to touch point j.

Figure 4A:
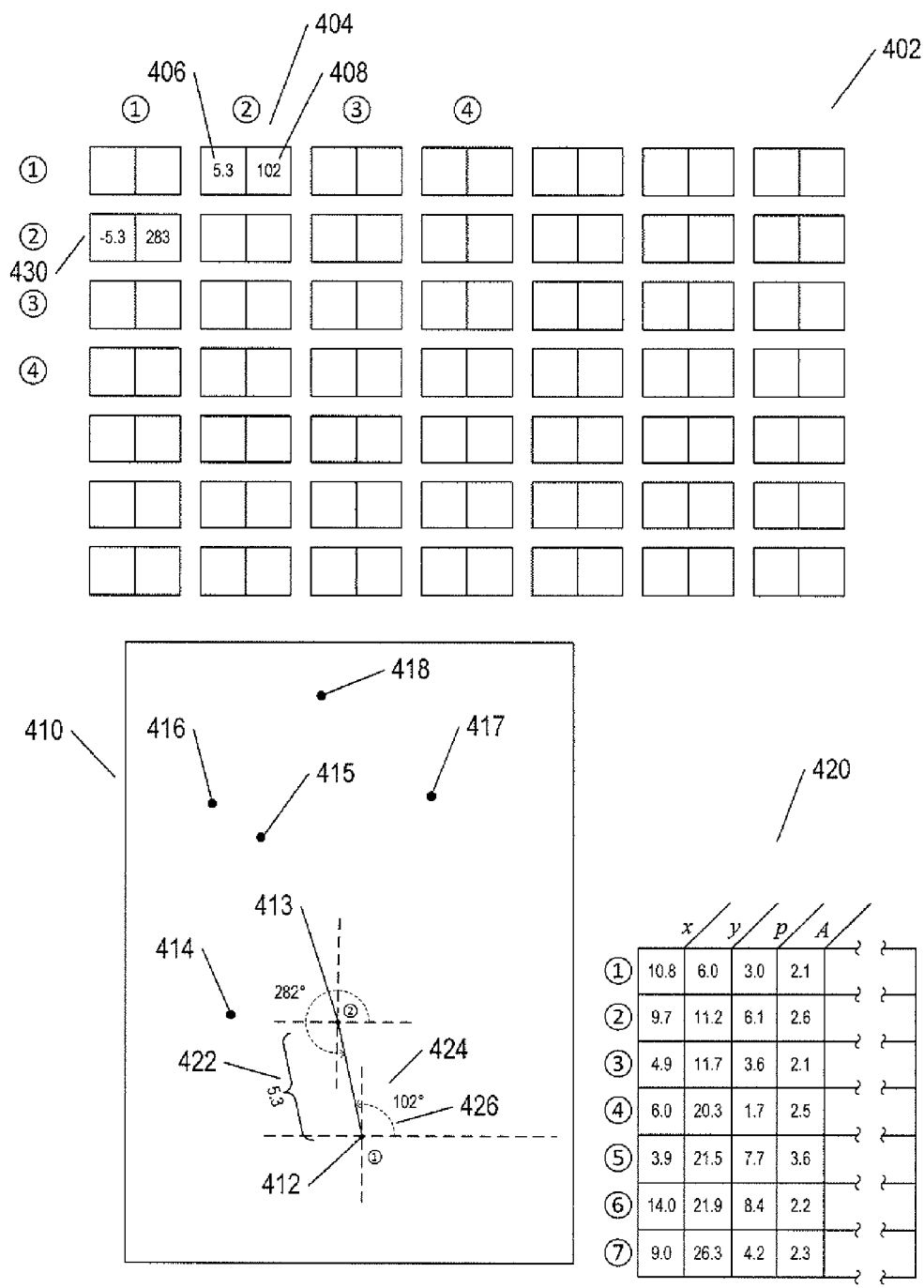
FIGS. 4A-E illustrate derivation of a distance-orientation matrix by the biometric subsystem from the touch-point data returned by the operating system during an ear scan.

FIG. 4A illustrates calculation of the matrix elements (1,2) and (2,1). The positions of the touch points is shown in the Cartesian plane 410. The first touch point 412 and the second touch point 413 are shown as small, shaded disks, each at the intersection of a horizontal and vertical dashed line to indicate local orientation of the Cartesian grid. Touch points 3-7 are represented by shaded disks 414-418, respectively. These touch points are equivalent to those shown in FIG. 3. The operating-system-provided data is again shown in table 420. The distance 422 between the first touch point 412 and the second touch point 413 can be computed from the well-known Cartesian-plane distance formula from the (x,y) coordinates of the two touch points. In the current discussion, distances are signed, with the distances for vectors from a first touch point to a second touch point pointing in the positive y direction having positive distances and the distances for vectors from a first touch point to a second touch point pointing in the negative y direction having negative values. Unsigned distances may also be employed in alternative implementations. The angle 424 from touch point 412 to touch point 413 can also be computed from the (x,y) coordinates of the two touch points using the x-coordinate displacement and y-coordinate displacement of the two points and the arc tan function. In the convention used in the current discussion is for the angle of a rightward-pointing horizontal vector to be 0° or 360° and, for all other vectors, the angle is measured in the counterclockwise direction from the positive x axis, as indicated by curved dashed line 426 in FIG. 4A. Therefore, element 404 of the direction-orientation matrix 402 includes the distance 5.3 (406 in FIG. 4A) and the angle 102 (408 in FIG. 4A). The distance and angle computed for the vector from touch point 1 to touch point 2 allows for straightforward calculation of a distance and angle from touch point 2 to touch point 1, stored in matrix element 430. Because the vector from touch point 2 413 to touch point 1 412 points downward, the distance is negative and the direction angle is 180 degrees plus the angle from touch point 1 to touch point 2, or 102°+180°=282°.

Figure 4B:
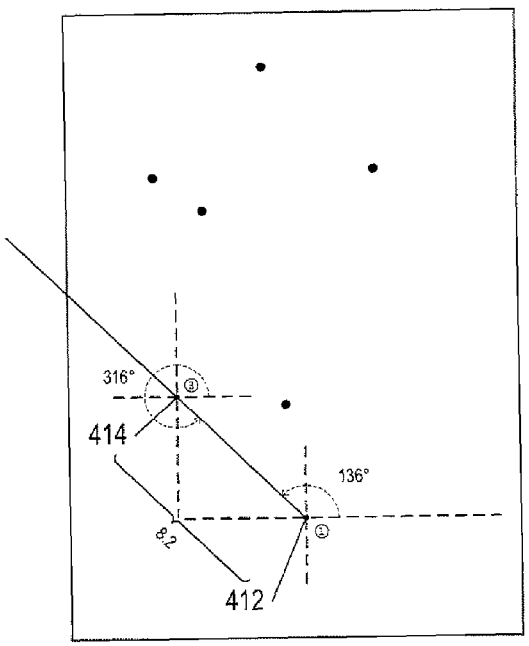
Figure 4C:
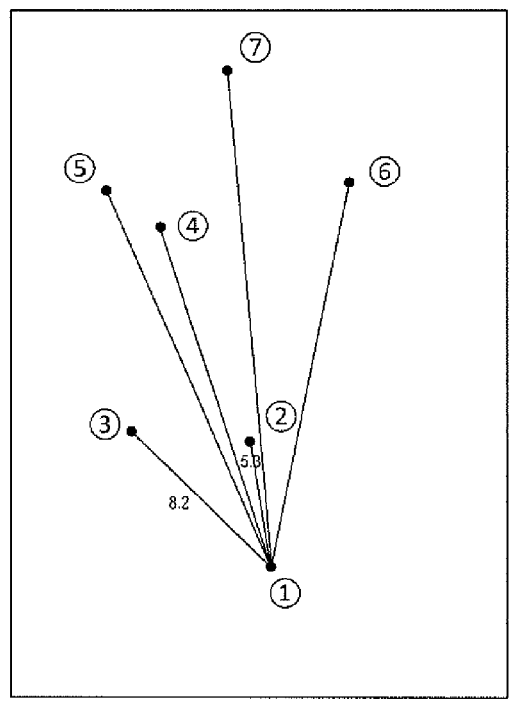
Figure 4D:
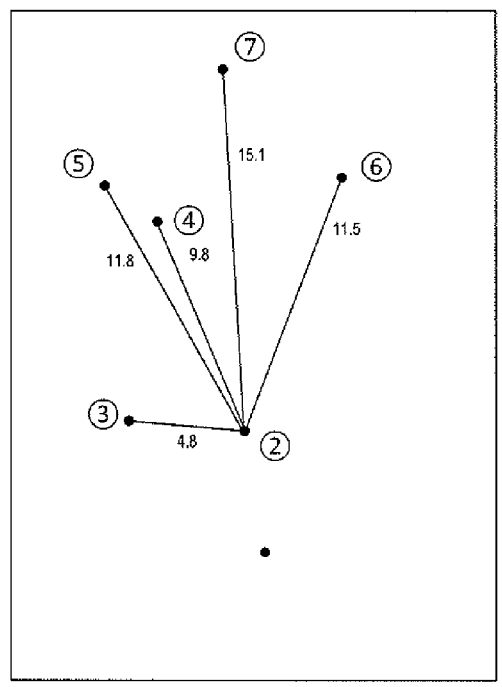
Figure 4E:
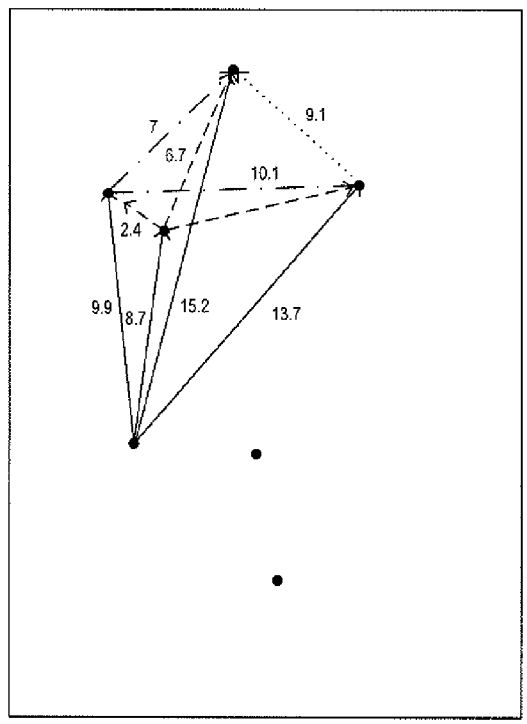

FIG. 4B illustrates computation of the distances and angles from touch point 1 412 to touch point 3 414 and from touch point 3 to touch point 1. The computed distances and vector angles are added to matrix elements 432, representing the distance and angle from touch point 1 to touch point 3, and 434, representing the distance and angle from touch point 3 to touch point 1. FIG. 4C illustrates computation of the distances and angles from touch point 1 to the remaining touch points and from the remaining touch points to touch point 1, filling out the first row and first column of the distance-orientation matrix. Note that each row of the distance-orientation matrix represents distances and angles of one touch point numerically labeled with the row index to all other touch points and each column of the distance-orientation matrix represents the distances and angles of all but one touch point to that touch point, labeled with the column index of the column. In general, each row of the distance-orientation matrix can be considered to be a type of numeric fingerprint for a touch point. The diagonal elements are empty, since they all represent 0 distance and an undefined angle. FIG. 4D illustrates computation of the distances and angles from touch point 2 to touch points 3-7 and from touch points 3-7 to touch point 2, filling out the second row and second column of the distance-orientation matrix, respectively. FIG. 4E shows the complete distance-orientation matrix.

The distance-orientation matrix is essentially an encoding of the relative positions of the touch points of an ear scan. When absolute-value or unsigned distances are used, the distances are both translation and rotation invariant. When signed distances are used, as in the currently described implementation, the distance information is translation invariant and somewhat orientation insensitive. In general, it is expected that user will place the touch screen to the user's ear in a relatively uniform fashion, so that while the distance and angle information for each touch-point pair varies from scan to scan, the variation is relatively small. Therefore, the distance and angle information included in the distance-orientation matrix represents a kind of numeric characterization of an ear print that is relatively insensitive to small variations in the relative orientation of the ear and the touch screen.

Figure 5A:
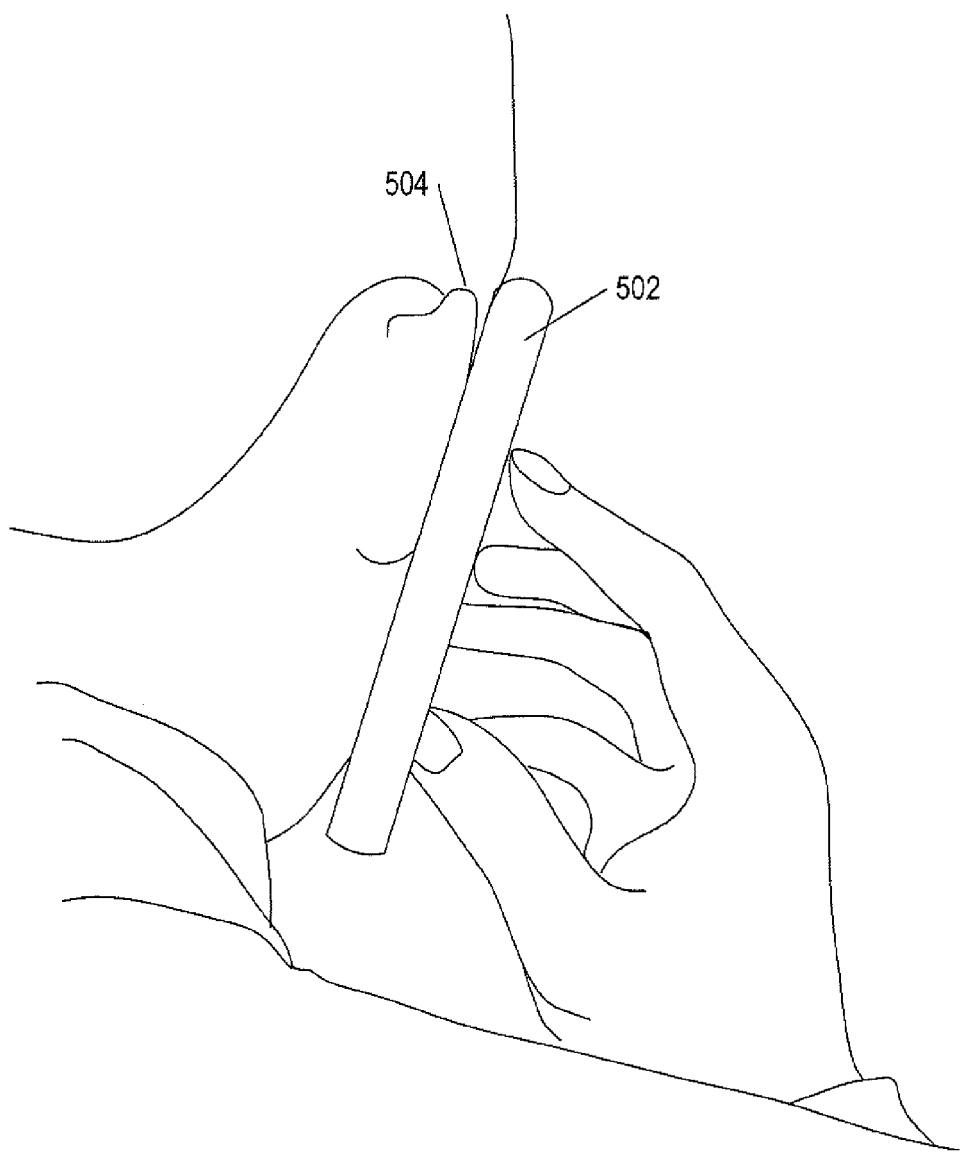
FIGS. 5A-B illustrate device-orientation information that can be provided by the operating system to the biometrics subsystem.
Figure 5B:
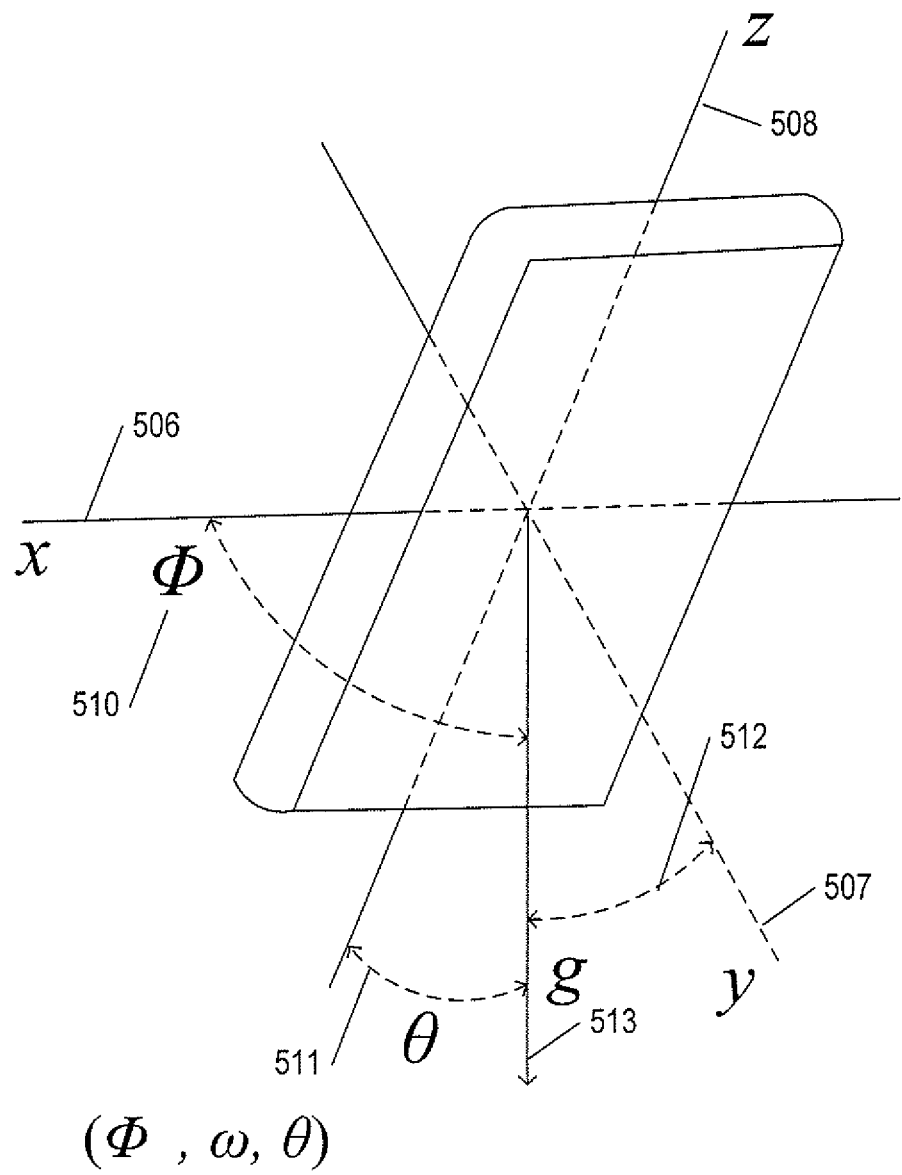

FIGS. 5A-B illustrate device-orientation information that can be provided by the operating system to the biometrics subsystem. As shown in FIG. 5A, when a user presses the touch-sensitive display screen of the mobile phone 502 to the user's ear 504, the mobile phone is generally oriented at an angle with respect to a standard three-dimensional Cartesian coordinate system with the z axis vertically oriented and the x,y plane horizontally oriented. As shown in FIG. 5B, a cell phone generally includes a three-axis accelerometer that allows the operating system of a cell phone to determine the cell phone's orientation with respect to the vertical direction, or direction of the gravity vector g. As shown in FIG. 5B, the cell phone is associated with a cell-phone three-dimensional Cartesian coordinate system 506-508 and the operating system of the cell phone can provide three angles 510-512 representing the angular displacements of the cell-phone coordinate axes from the gravitational vector 513. These three angles are representative of the cell phone's orientation in space relative to the radial direction from the center of the earth outward or, in other words, from the local vertical direction with respect to the cell phone. Because the cell phone orientation is generally a product of a user's body size and geometry, the three angles produced by the operating system provides a type of numeric fingerprint, or biometric, for a particular user, since users tend to position and hold the cell phone similarly for each ear scan. Note also that the determined cell-phone orientation is invariant to rotation perpendicular to the vertical axis, so that a change in the direction in which a user is facing does not change the orientation angles.

Figures 6A, 6B:
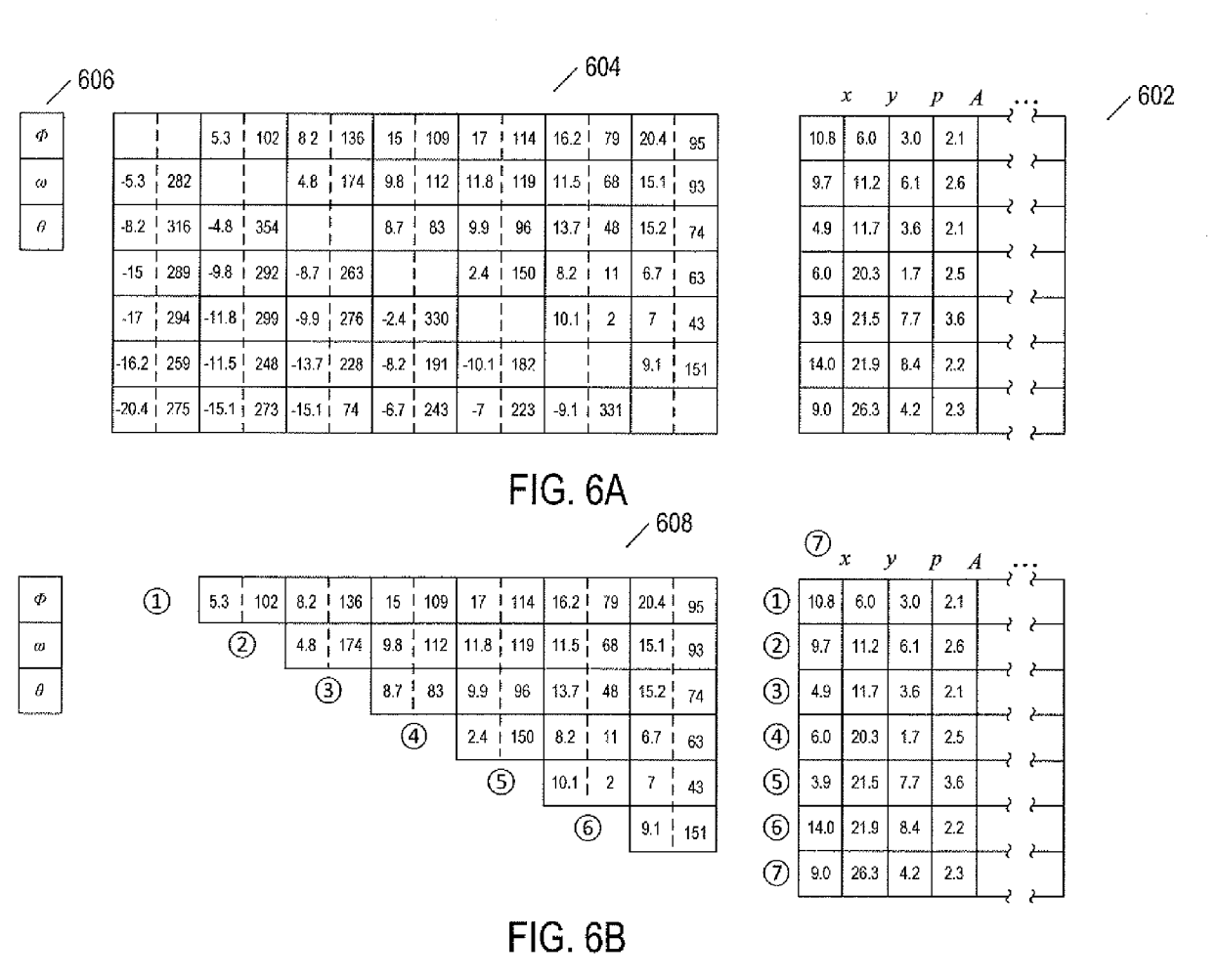

FIGS. 6A-B illustrate the total operating-system-provided and derived data collected and derived by the biometrics subsystem to represent an ear scan. As shown in FIG. 6A, the data includes the operating-system-provided coordinate, pressure, and area data 602, the distance-orientation matrix 604, and the three angles of the cell-phone axes with respect to the gravitational vector 606. As shown in FIG. 6B, this data can be compressed because the data in the elements of the distance-orientation matrix below the diagonal are straightforwardly, as discussed above, derived from the data in the elements above the diagonal. Thus, in an optimized scenarios, only the upper elements 608 of the distance-orientation matrix need be stored for an ear scan. In certain implementations, the distance-orientation matrix values may be computed, on the fly, from the operating-system-provided data (602 in FIG. 6A) rather than stored as a matrix.

Figure 7A:
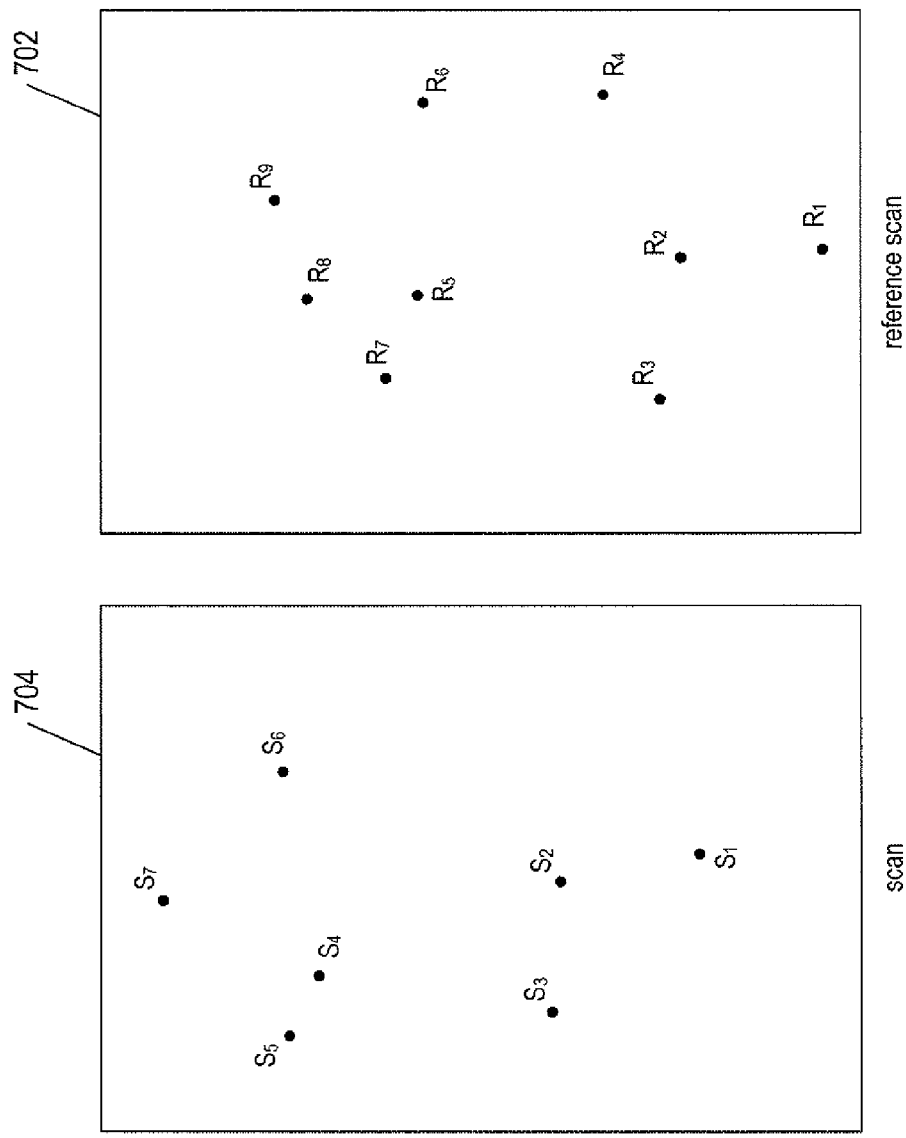
Figure 7B:
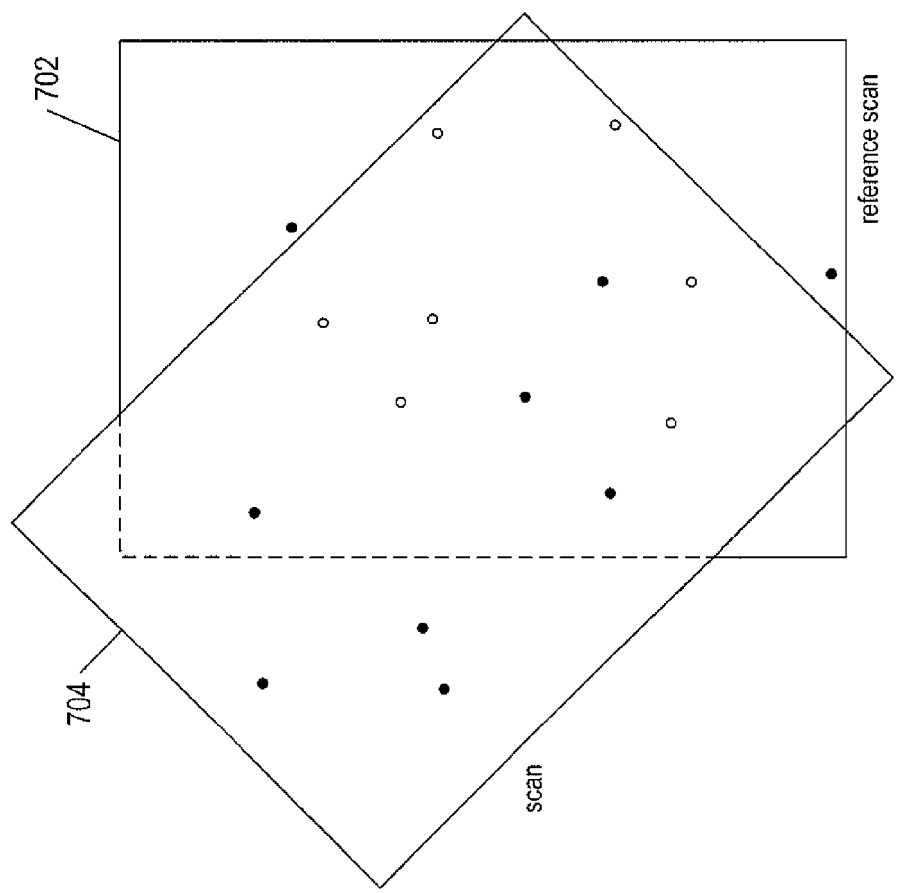
Figure 7D:
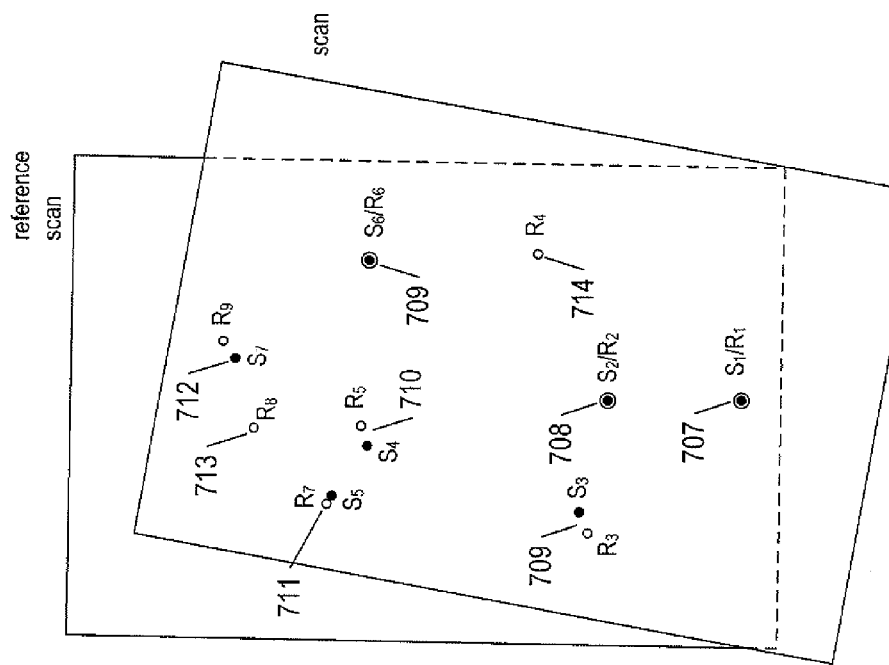

FIGS. 7A-E illustrate a general approach to determining how closely the pattern of touch points in an ear scan match the pattern of touch points of a reference ear scan. This matching process is a significant component of the computation of an ear-scan-based biometric used in the authentication process. FIG. 7A shows a visual representation of the touch points of a reference scan 702 and a visual representation of the touch points of a new ear scan 704 that is to be compared to, or matched against, the reference scan. The general approach can be visualized as placing the representation of the new ear scan 704 above and overlaying the reference ear scan 702, as shown in FIG. 7B, translating and rotating the visual representation of the new ear scan so that a visually identifiable touch point of the new scan overlays the corresponding touch point in the reference scan, as represented by the superimposed point 706 in FIG. 7C, and then continuing to rotate the new scan, as shown in FIG. 7D, to an orientation in which as many points in the new scan overlap corresponding points in the reference scan 706-708 and the distances between the remaining pairs of corresponding points is minimized 709-712. There may be reference-scan touch points, such as touch points 713 and 714, without corresponding new-scan touch points as well as new-scan touch points without corresponding reference-scan touch points.

Figure 7E:
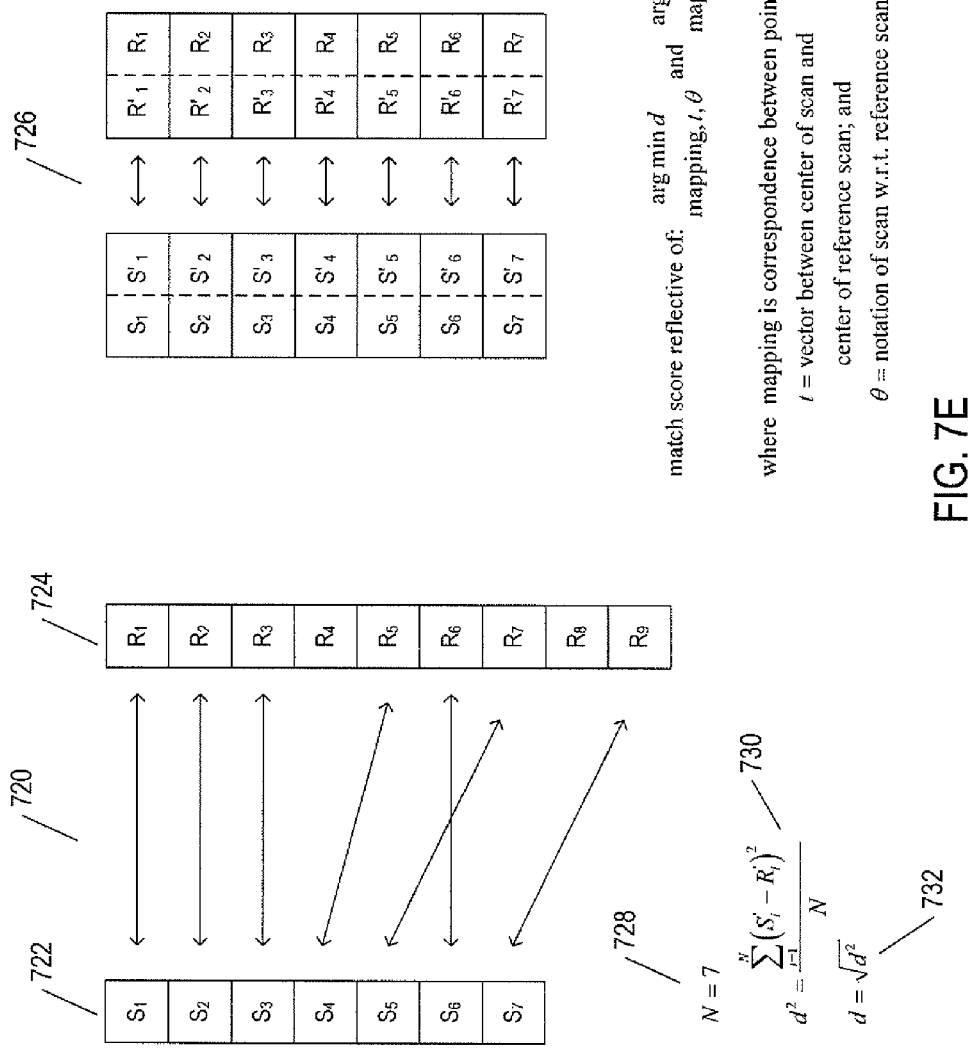

As shown in FIG. 7E, when an optimal overlapping of the new scan and the reference scan is achieved, a mapping 720 can be derived between new scan touch points, shown in column 722, and reference-point touch points, shown in column 724. The mapping may be compressed 726 to include only the corresponding new-scan and reference-scan points, both relabeled to have names with monotonically increasing subscripts. The number N is equal to the number of corresponding pairs of points 728, in the current case 7. An aggregate difference metric $d^2$ can be computed as the average of the squared differences of the positions of the corresponding touch points 730 or the square root d of the squared difference metric $d^2$ 732. The smaller the value of d, the better the correspondence between the new-scan touch points and the reference-scan touch points. Finally, as shown on the right-hand, lower portion of FIG. 7E 734, a match score can be computed that is reflective of a computational process of determining the best overlapping, such as the overlapping shown in FIG. 7D, in which the difference metric d is minimized and the number of exactly or very closely corresponding touch-point pairs N is maximized over all possible mappings between new-scan and reference-scan touch points, all possible translations between the two sets of touch points, and all possible angular relative displacements of the two sets of touch points. This type of matching of a set of new-scan touch points to reference-scan touch points is general and precise, but can be computationally intractable. Because there may be fewer new-scan touch points than reference-scan touch points, or fewer reference-scan touch points than new-scan touch points, and because certain of the touch points in one of the two scans may not have a corresponding touch point in the other of the two scans, an extremely large number of possible mappings is generally possible, leading to a combinatorial explosion when all possible mapping, translation, and orientation triples are evaluated to explore the search space. Thus, this matching method, while effective, represents an extreme end in the range of computational complexity for ear-scan-matching methods that may be employed by the biometric subsystem.

Figure 8:
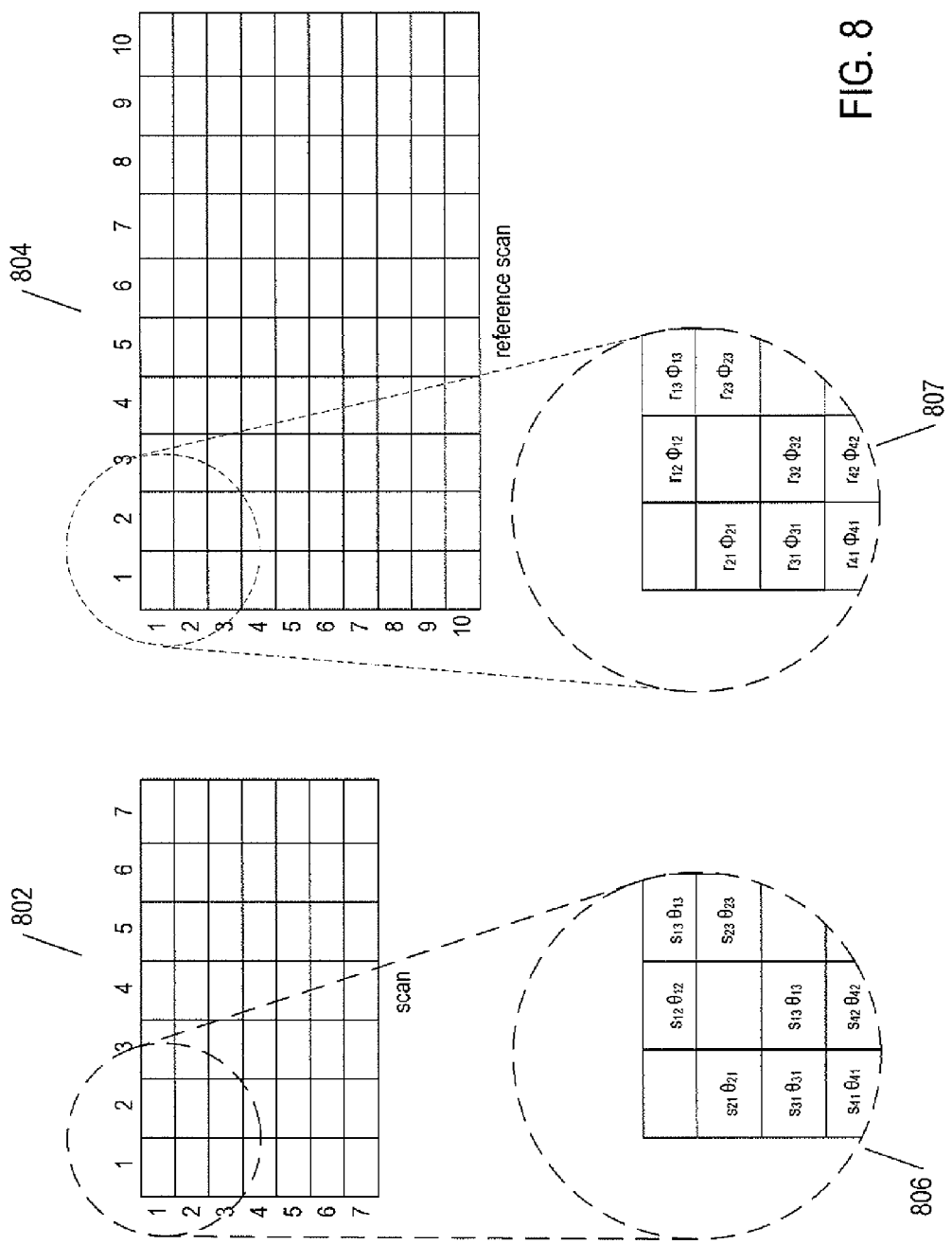
FIG. 8 illustrates a notation convention used for scan data in subsequent discussion.

FIG. 8 illustrates a notation convention used for scan data in subsequent discussion. In discussing various different types of matching methods, it will generally be assumed that a scan, represented by one set of scan data 802, is to be compared to, or matched against, a reference scan represented by a second set of scan data 804. In FIG. 8, only the distance-orientation-matrix portion of the scan data for the two scans is shown. As shown in insets 806 and 807 in FIG. 8, the distance value contained in a matrix element of the scan data or touch point 1 to touch point 2 is represented by $s_{12}$ and the angle between touch point 1 and touch point 2 is represented by $\theta_{12}$. In the reference scan data, the distance between touch point 1 and touch point is represented by $r_{12}$ and the angle from touch point 1 to touch point 2 is represented by $\phi_{12}$.

Figure 9:
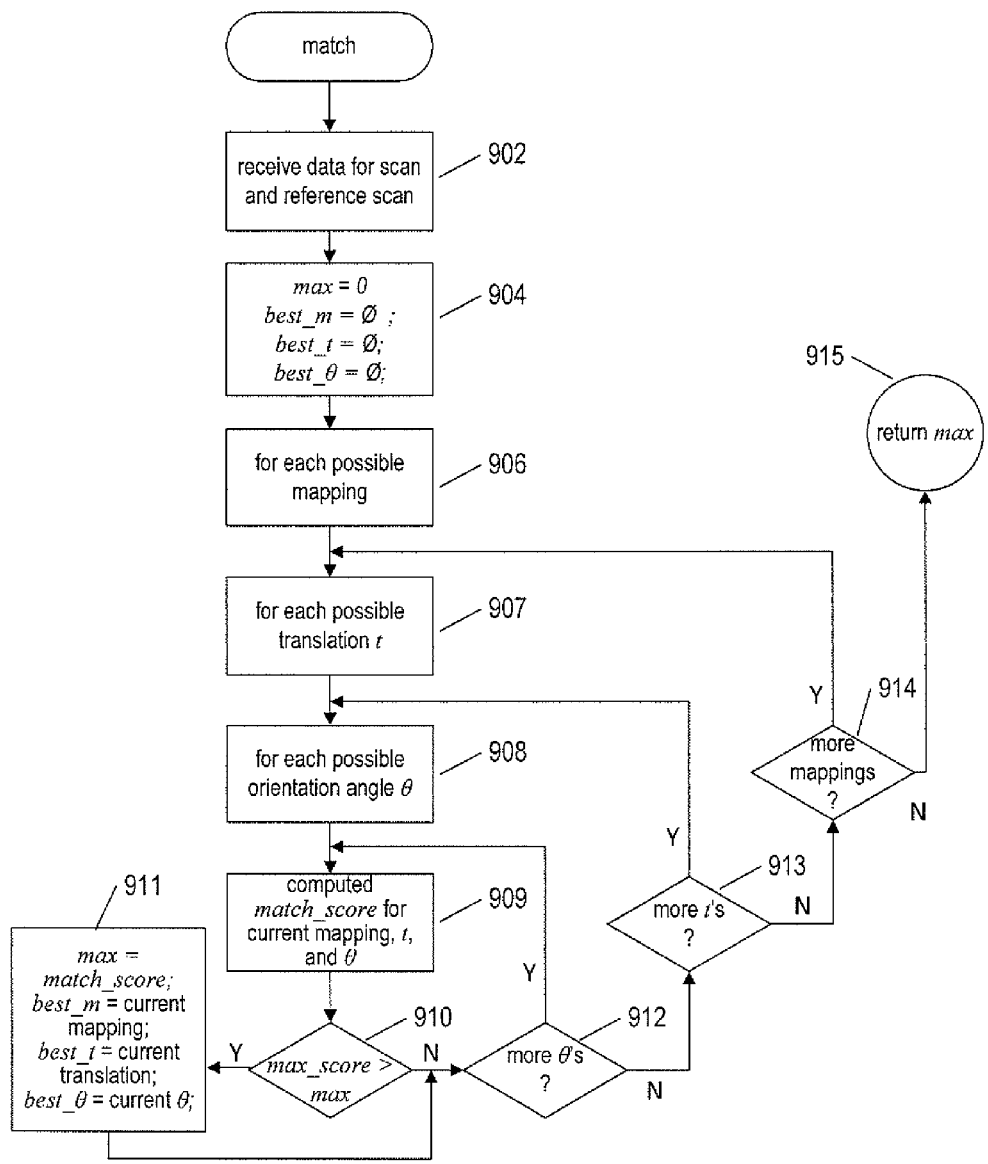
FIG. 9 provides a control-flow diagram for the general matching method discussed above with reference to FIGS. 7A-E.

FIG. 9 provides a control-flow diagram for the general matching method discussed above with reference to FIGS. 7A-E. In step 902, the routine "match" receives data a new scan and a reference scan. In step 904, the routine "match" sets local variables max to 0 and best_m, best_t, and best_$\theta$ to some type of null value. Then, in the triply nested for-loops of steps 906-914, all possible translational displacements, angular displacements, and touch-point mappings between the scan and the reference scan are computationally explored in order to find the best possible overlap between the touch points of the scan and the touch points of the reference scan, with the match score computed from the best possible overlap returned in step 915. As discussed above, while precise, this method represents an extreme in the range of computational complexities of matching methods that can be employed by the biometric subsystem and may be infeasible for many implementations.

Figure 10A:
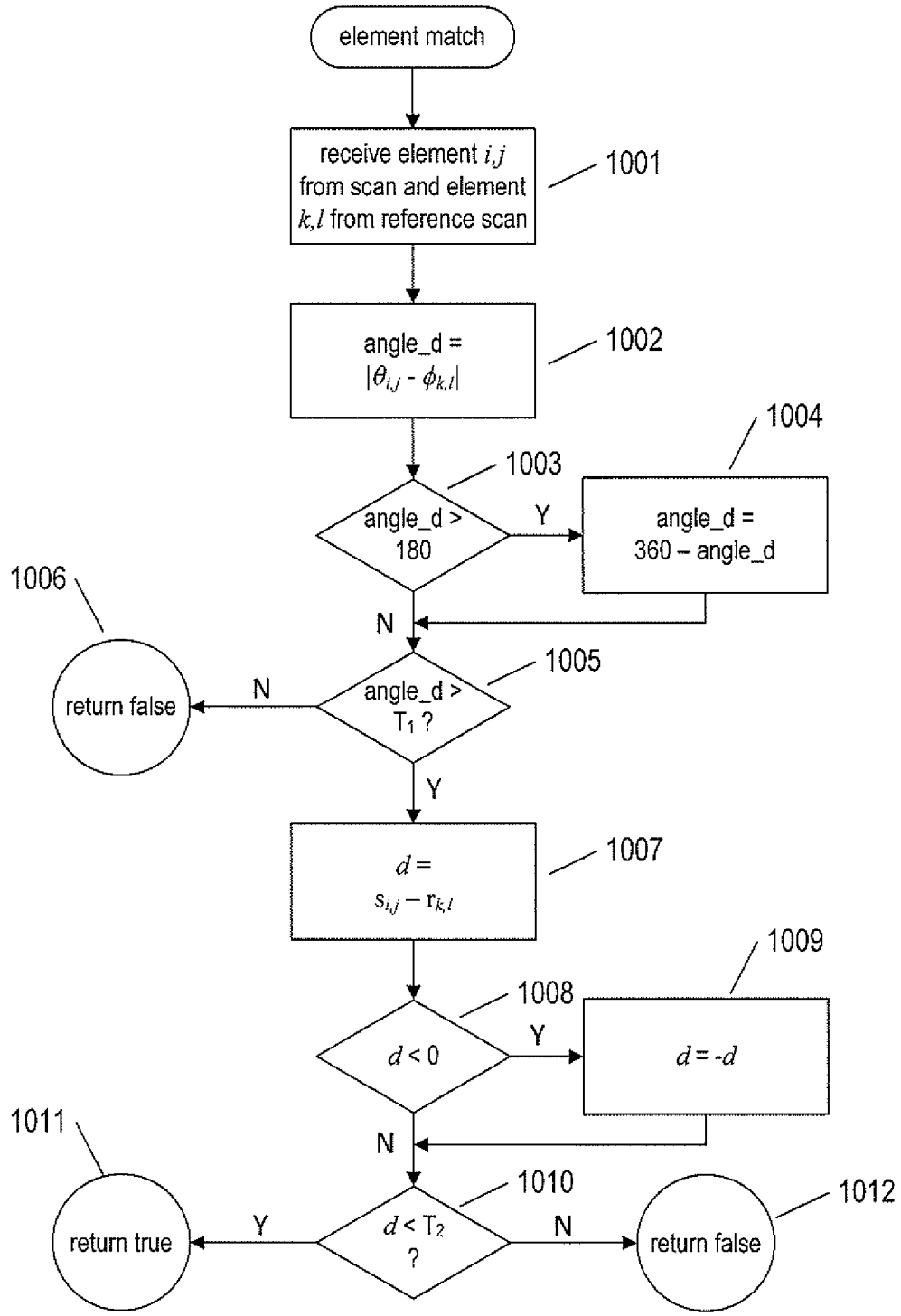
FIGS. 10A-H provide control-flow-diagram-based illustrations of two different alternative lower computational-complexity touch-pattern matching methods that may be employed by the biometrics subsystem.

FIGS. 10A-H provide control-flow-diagram-based illustrations of two different alternative lower computational-complexity touch-pattern matching methods that may be employed by the biometrics subsystem. FIG. 10A shows an element-match routine that determines whether or not an element from the scan distance-orientation matrix matches an element in the reference-scan distance-orientation matrix. In step 1001, the routine "element match" receives an element i,j from the scan distance-orientation matrix and the element k,l from the reference-scan distance-orientation matrix. In step 1002, the routine "element match" computes the absolute value of the difference between the two orientation angles and the two matrix elements. When the computed difference is greater than 180°, as determined in step 1003, the difference is adjusted to fall in a range of 0° degrees to 360° degrees, in step 1004, by computing the circular complement of the computed difference. When the difference is greater than a threshold value $T_1$, as determined in step 1005, the routine "element match" returns false, in step 1006. Otherwise, the difference d between the distance values in the two matrix elements is computed in step 1007. When the computed difference is negative, as determined in step 1008, it is changed to positive in step 1009. When the computed difference in distance is less than a second threshold value $T_2$, as determined in step 1010, the routine "element match" returns true in step 1011. Otherwise, the routine "element match" returns false in step 1012. Thus, two distance-orientation-matrix elements match when the differences between their distance values and between their angle-measure values fall below threshold values. When two distance-orientation-matrix elements from two difference distance-orientation matrices match, there is a possibility that the two distance-orientation-matrix elements represent a same relative distance and orientation between two corresponding touch points in the two touch-point patterns corresponding to the two distance-orientation matrices. Note that thresholds are generally referred to, in the control-flow diagrams, by the notation "$T_x$." The thresholds represent points of adjustability, as discussed further below.

Figure 10B:
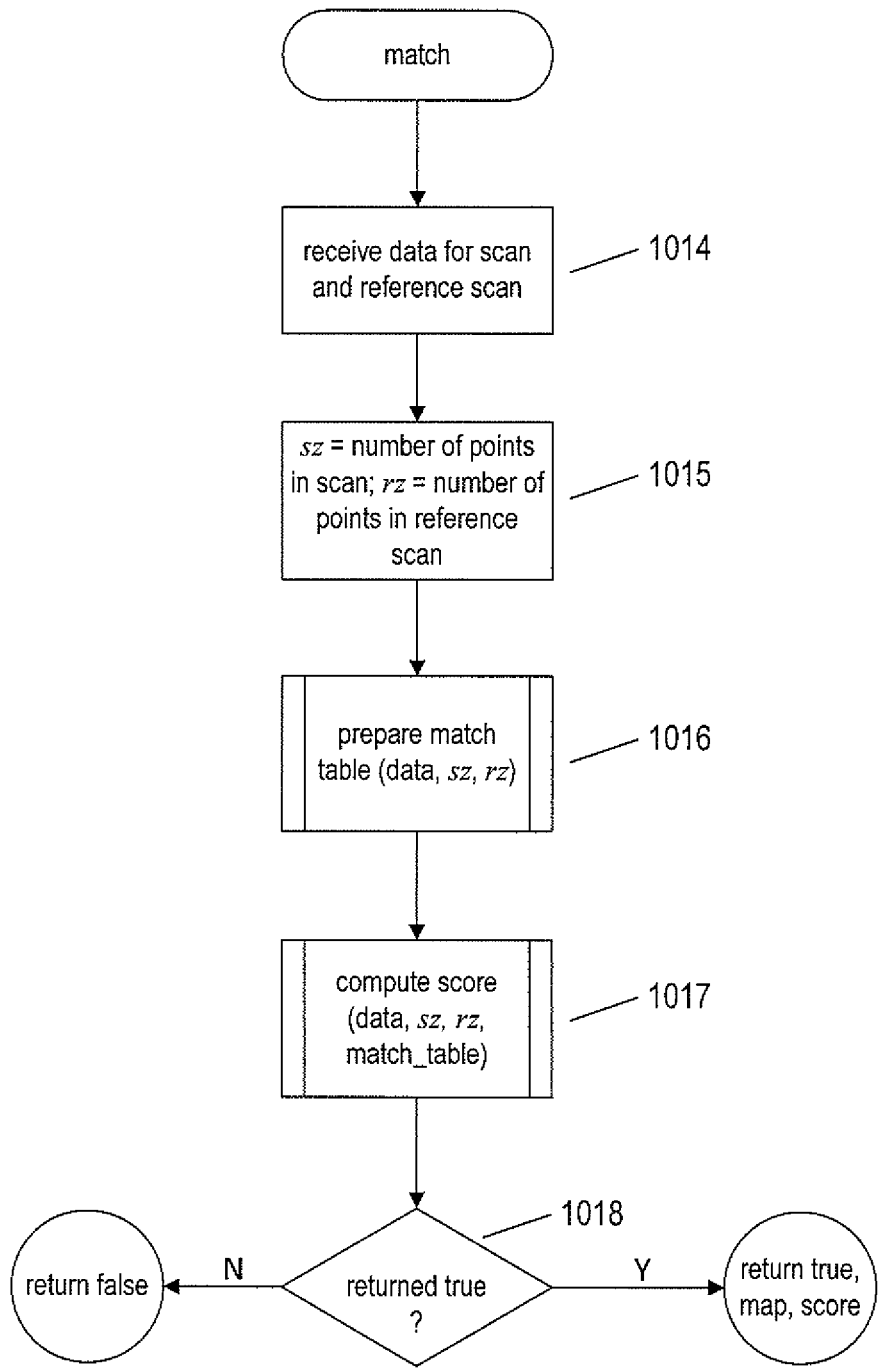
Figure 10C:
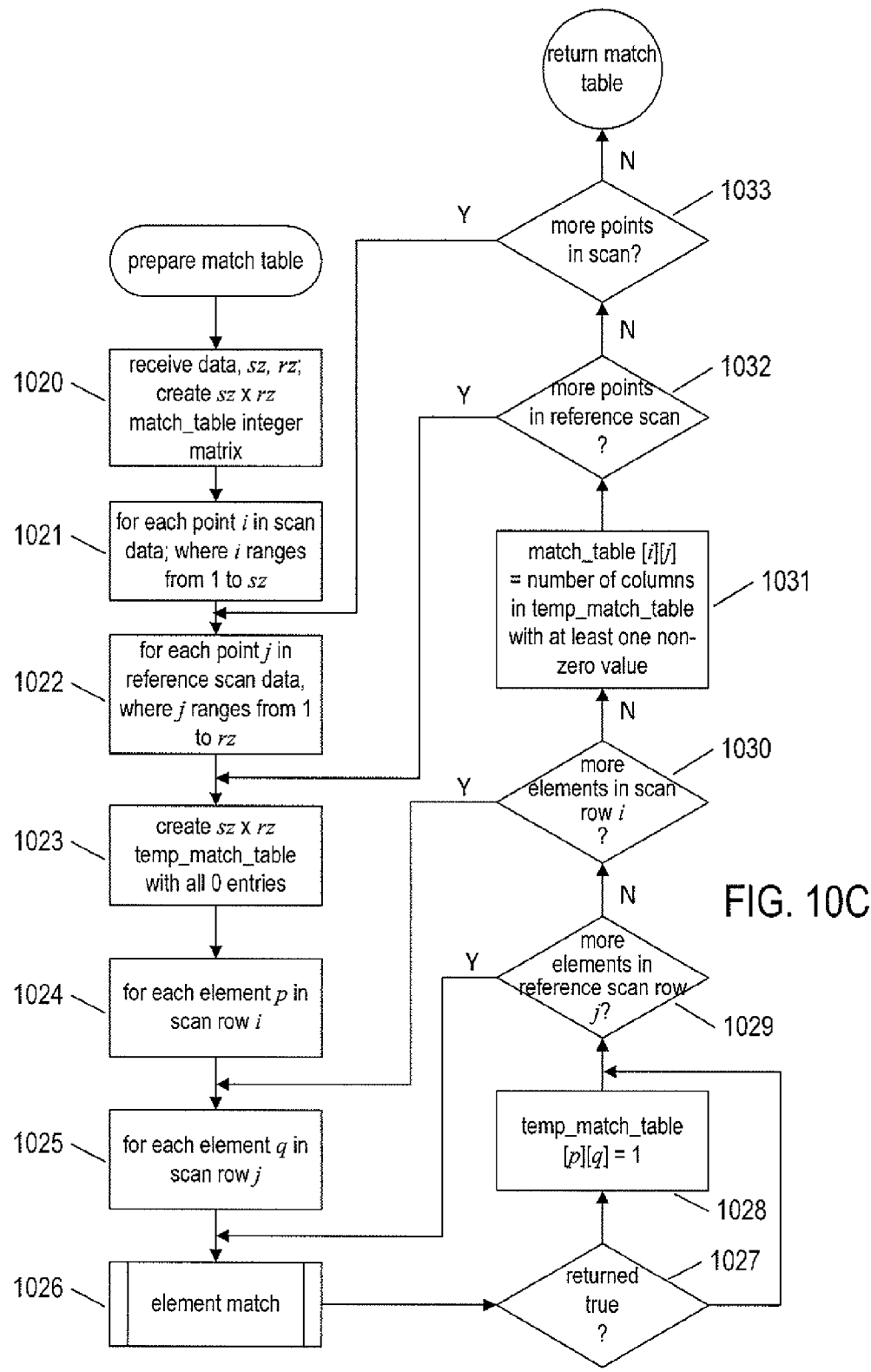
Figure 10D:
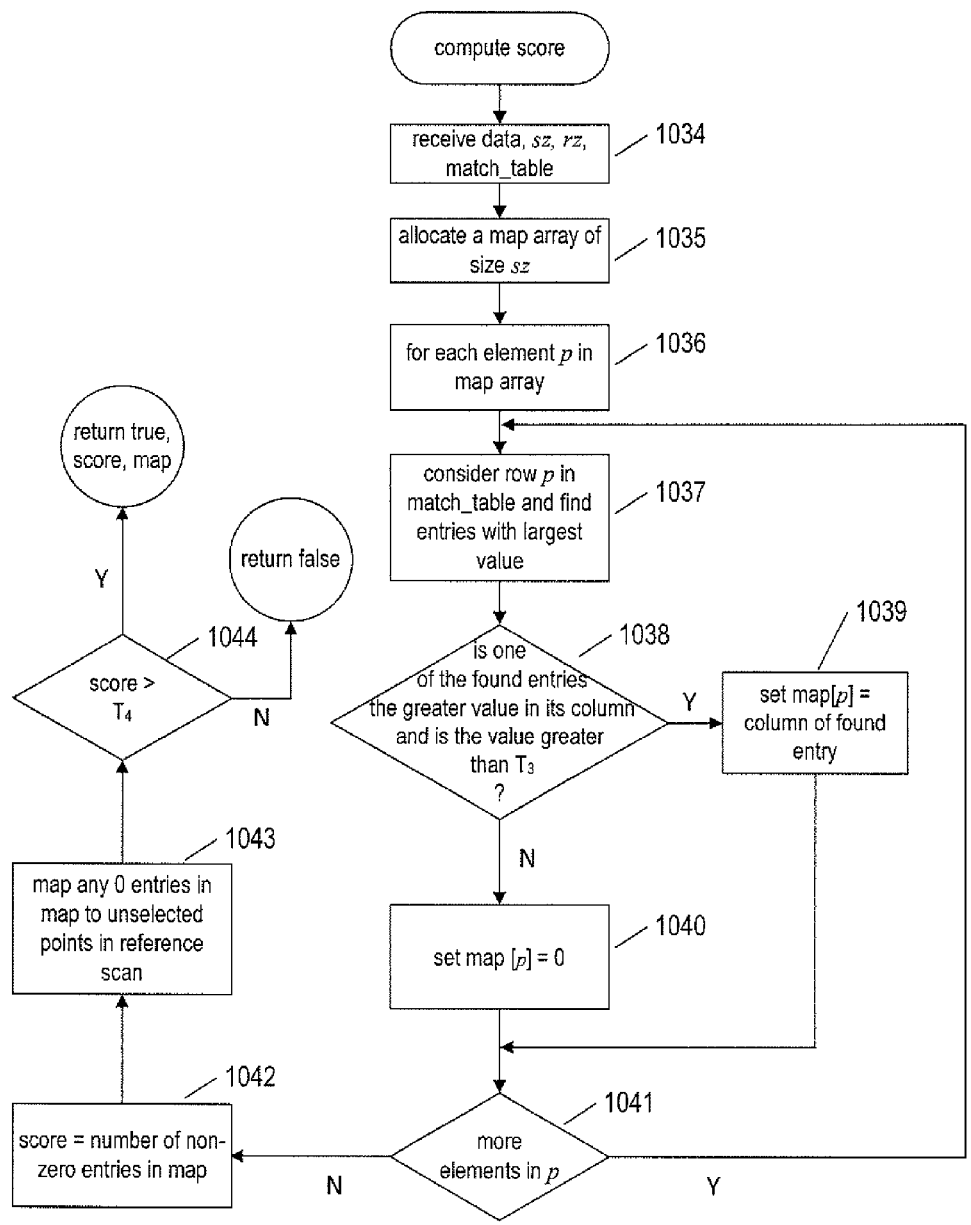

FIGS. 10B-D illustrate a first implementation of a matching routine that matches a set of scan touch points to a set of reference-scan touch points. In step 1014, the routine "match" receives the data, discussed above with reference to FIGS. 6A-B, for the scan and reference scan. In step 1015, the routine "match" determines the number of touch points in the scan, sz, and the number of touch points in the reference scan, rz. In step 1016, the routine "match" calls the routine "prepare match table" to prepare a match table from the received data. In step 1017, the routine "match" calls the routine "compute score" to compute a match score from the match table prepared in the previous step and the scan data. When the routine "compute score" returns the value true, as determined in step 1018, the routine "match" returns, in step 1019, the value true along with a mapping of scan touch points to reference-scan touch points and a score. Otherwise, the routine "match" returns the value false.

FIG. 10C provides a control-flow diagram for the routine "prepare match table" called in step 1016 of FIG. 10B. In step 1020, the routine "prepare match table" receives the scan data, sz, and rz and creates an sz×rz match-table integer matrix. Each element in this matrix match-table[i][j] is provided a value, in subsequent steps, reflective of the likelihood of correspondence between the touch point represented by row i in the scan distance-orientation matrix and the touch point represented by row j in the reference-scan distance-orientation matrix. In the nested for-loops of steps 1021-1033, the routine "prepare match table" fills the match-table integer array with numeric values, considering each possible pairing between a touch point i in the scan data and a touch points j in the reference scan data in order to determine the value to place in the match-table matrix for the pair of touch points i,j. In step 1023, the routine "prepare match table" creates an sz×rz temp-match-table integer array with all 0 entries. Then, in the nested for-loops of steps 1024-1030, the routine "prepare match table" considers all possible pairings between elements in row i of the distance-orientation matrix of the scan data and the elements in row j of the distance-orientation matrix of reference-scan data. When the currently considered pairing between distance-orientation matrix elements matches, as determined by a call to the routine "element match" in step 1026, the temporary-match-table element temp_match_table [p][q] is assigned the value of 1, in step 1028. Once all possible pairings between row elements have been considered in the nested for-loops of 1025-1030, a match-table value for the touch-point pair i and j is computed in step 1031. This computed value is the number of columns in the temporary-match-table that have at least one non-zero value. In other words, the larger this number, the greater the likelihood that the scan touch point represented by row i of the scan distance-orientation matrix corresponds to the reference-scan touch point represented by row j of the reference-scan distance-orientation matrix. This is an indication of the level of correspondence between scan touch point i and reference-scan touch point j.

FIG. 10D provides a control-flow diagram for the routine "compute score," called in step 1017 in FIG. 10B. In step 1034, the routine "compute score" receives the scan data, sz and rz, and the match table prepared by the routine "prepare match table." In step 1035, the routine "compute score" allocates a map array of size sz. The map array has an entry for each touch point in the scan. The entry, once the routine "compute score" completes, includes either the value 0, indicating that there is no corresponding reference-scan touch point, or a numeric label or name for the corresponding reference-scan touch point. This is a touch-point correspondence map such as the correspondence map 720 in FIG. 7E. In the for-loop of steps 1036-1041, each element p in the map is considered, where p represents a scan touch point. In step 1037, the row p of the match table is considered and the one or more entries with the largest value in that row are identified. When one of the entries has a greatest value of any entry in the column of the match table in which the entry is located and when the value of the entry is greater than a threshold $T_3$, as determined in step 1038, then, in step 1039, the map element p is set to the column index of the column in which the entry identified in step 1038 is located. This represents the selection of a most likely corresponding touch point from the reference scan that corresponds to touch point p in the scan. Because the value of the entry is the greatest value of any entry in the column, the correspondence is uniquely selected. When no entry meets the requirements of step 1038, then the map element for touch point p is set to 0, to indicate no initially identified corresponding reference-scan touch point, in step 1040. Once the for-loop of steps 1036-1041 completes, a match score is computed, in step 1042, as the number of non-zero entries in the map or, in other words, the number of reference-scan touch points that correspond to scan touch points. In step 1043, any additional scan touch points that can be matched to reference-scan touch points are so mapped, based on entry values, to provide the best possible mapping between scan touch points and reference-scan touch points. This second mapping step considers potential correspondences that do not rise to the requirements of step 1038. When the score is greater than a threshold $T_4$, as determined in step 1044, then the routine "compute score" returns the value true along with the score and the map. Otherwise, the routine returns the value false. The method described in FIGS. 10B-D is a so-called greedy algorithm that endeavors to select the best possible touch-point correspondences for each next-considered scan touch point, rather than exploring a large number of possible mappings. Many variations on this method are possible. For example, rather than proceeding in the row order of the scan data in the for-loop of steps 1036-1041, a different ordering for touch-point-correspondence selection may be used, such as greedily ordering the scan touch points for sequential selection of corresponding reference-scan points in addition to greedy selection of corresponding reference-scan points. As can be easily appreciated, the touch-point-pattern matching method described in FIGS. 10B-D represents a very computationally efficient match, because the method does not attempt to find an optimal overlapping within a large combinatorial space. However, the method may not find optimal mappings or even near-optimal mappings, in many cases.

FIGS. 10E-H illustrate a second matching method. This matching method explores a small subset of the total space of possible mappings in order to find a best mapping between scan touch points and reference-scan touch points. The exploration is carried out in a recursive, tree-like fashion, trying path-like mappings that branch out from the first found correspondence between a scan touch point and a reference-scan touch point. This method also uses the element-match routine discussed above with reference to FIG. 10A. The thresholds used in the second implementation are generally different from the thresholds used in the first implementation, discussed above with reference to FIGS. 10B-D, even when labeled by identical "$T_x$" labels.

Figure 10E:
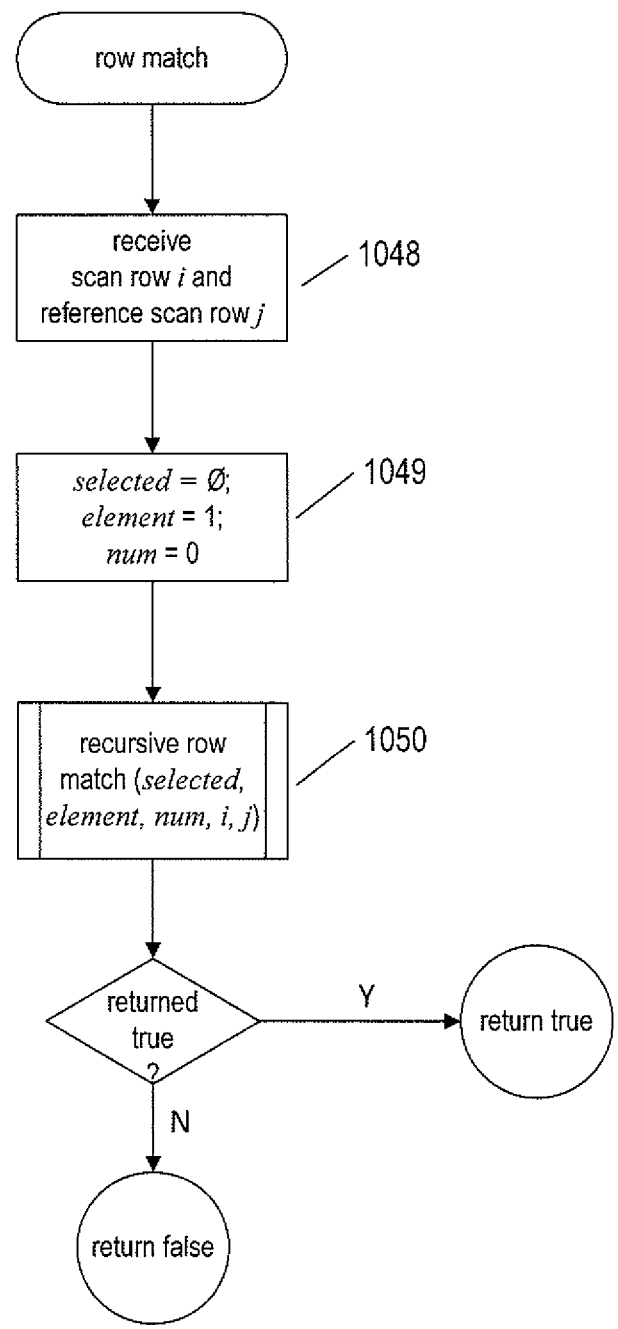

FIG. 10E shows a control-flow diagram for the routine "row match," which determines whether or not a row from the scan data potentially matches a row from the reference-scan data, indicating that there may be a correspondence between the two touch points represented by the two rows. In step 1048, the routine "row match" receives a scan row i and a reference-scan row j. In step 1049, the local variable num is set to 0, local variable element is set to 1, and the ordered-set variable selected is set to the null or empty set. In step 1050, the routine "row match" calls the routine "recursive row match." The routine "row match" returns the value returned by the routine "recursive row match," called in step 1050.

Figure 10F:
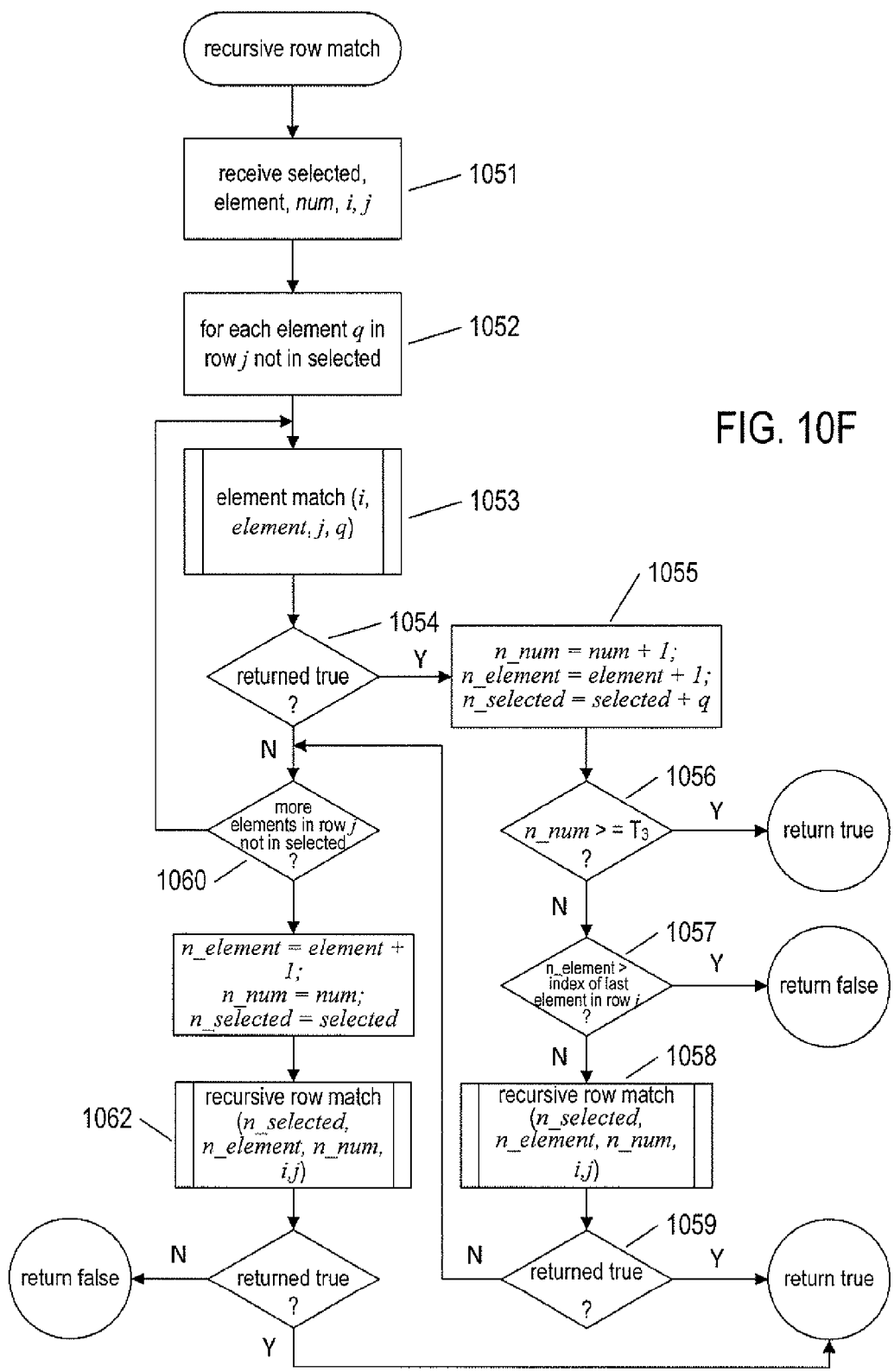

FIG. 10F provides a control-flow diagram for the routine "recursive row match" called in step 1050 of FIG. 10E. This routine recursively explores different possible matchings between elements in the scan row i and reference-scan row j in order to find a matching with at least a threshold number of corresponding pairs, each pair including an element in row i and an element in row. In step 1051, the routine "recursive row match" receives the rows i and j, the set selected, and the values of variables element and num. Note that, in general, in the control-flow diagrams provided in this documents, variables are passed by value, except for scan-representing data sets, which are passed by reference. In the for-loop of steps 1052-1060, all unselected elements of the reference-scan row j are considered for matching to the scan-row element identified by variable element. When the current considered row element to reference-scan element pairing produces a match, as determined by a call to the routine "element match" in step 1053 and conditional step 1054, then new local copies of the variables num, element, and selected are made with values incremented by 1, for the new copies n_num and n_element and with element q added to the set n_selected, in step 1055. This prepares for a recursive call to the routine "recursive row match," in step 1058. When the value of n_num is greater than or equal to the threshold value $T_3$, as determined in step 1056, a sufficient number of pairwise correspondences between elements in scan row i and reference-scan row j have been found to return the value true, indicating a match between the two rows. Otherwise, when the value of the variable n_element is greater than the index of the last element in scan-data-row i, as determined in step 1057, no further recursion is possible and the routine "recursive row match" returns the value false. Otherwise, a recursive call to the routine "recursive row match" is made, in step 1058, to seek additional matches between row elements. When the value true is returned, as determined in step 1059, then the routine "recursive row match" also returns true, since a sufficient number of element matches were found to declare a match between row i and row j. Otherwise, the for-loop of steps 1052-1060 continues iterating until there are no more unselected elements of reference-scan row j to consider. In that case, no match has been found for the scan row element identified in the variable element but an additional recursive call to the routine "recursive row match" is made in step 1062 to determine whether or not a sufficient number of element matches can be found to declare a match between row i and row j, despite the fact that the currently considered element of row i does not have a matching element in row j. Thus, the routines "row match" and "recursive row match" together determine whether or not there are sufficient matches between elements in the distance-orientation-matrix rows for a scan touch point and reference-scan touch point to consider the two touch points as potentially corresponding to one another. This recursive method considers numerous possible mappings between the elements of row i and row j. Again, matching rows are possible candidates for a touch-point correspondence.

Figure 10G:
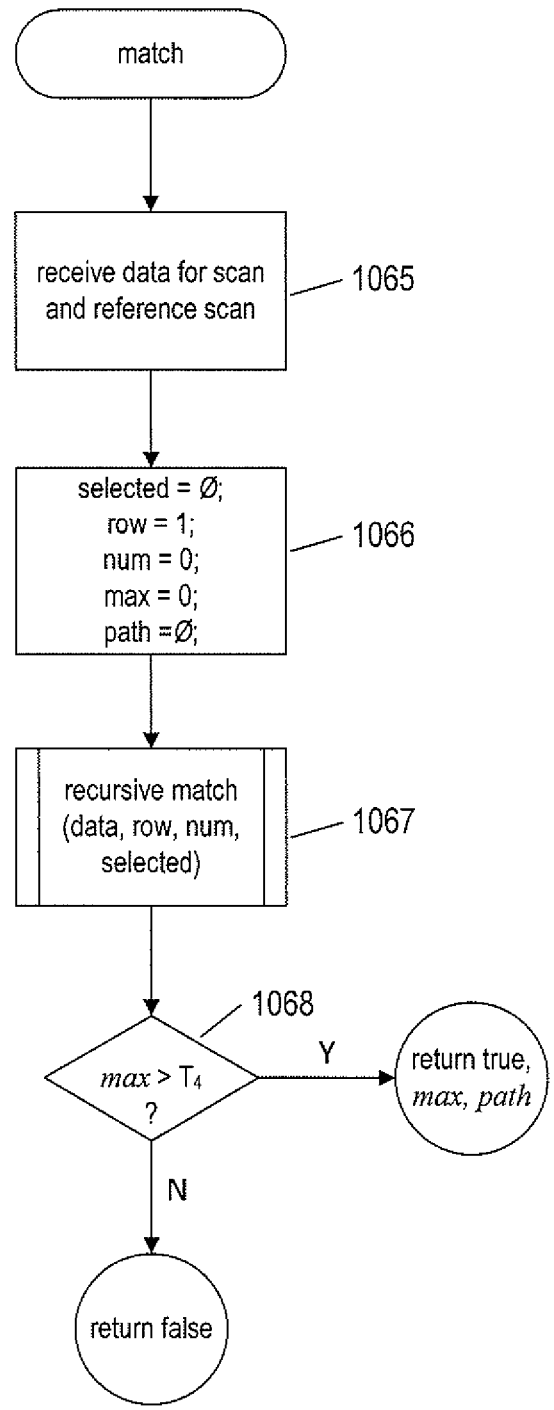
Figure 10H:
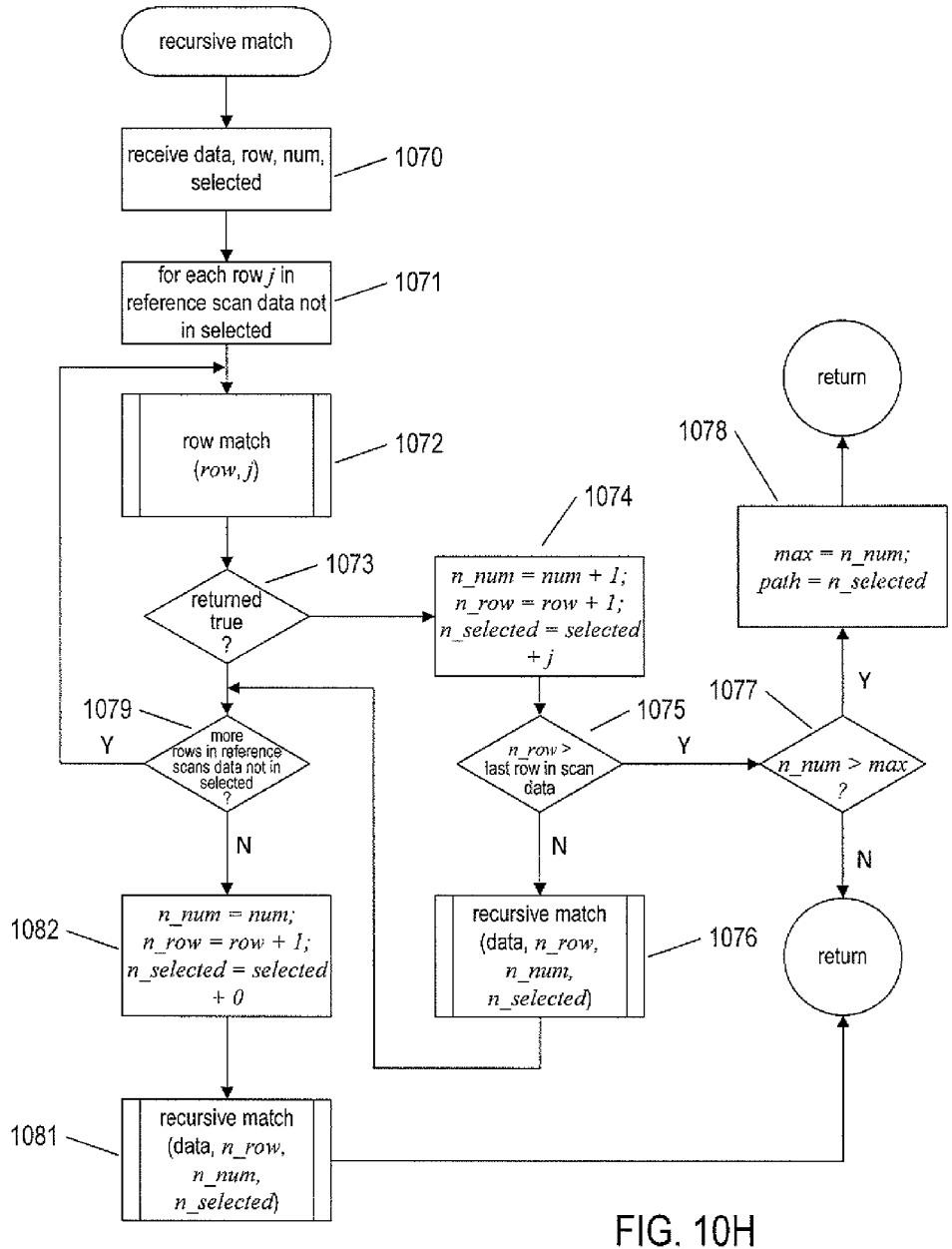

FIGS. 10G-H provide control-flow diagrams for the routine "match" and the routine "recursive match" that together determine whether the scan matches the reference scan and, when so, a mapping between scan touch points and reference-scan touch points as well as an indication of the number of touch-point correspondence. FIG. 10G provides a control-flow diagram for the routine "match." In step 1065, the routine "match" receives data representations for the scan and reference scan. In step 1066, the routine "match" sets two ordered-set variables selected and path to null, sets a local variable max to 0, sets local variable num to 0, and sets local variable row to 1. In step 1067, the routine "match" calls the routine "recursive match" to attempt to match the touch points in the scan data to the touch points in the reference-scan data. When the number of matched touch points, or touch-point correspondences, exceed a threshold $T_4$, as determined in step 1068, the routine "match" returns the value true, the number of touch-point correspondences identified, and a map between scan touch points and reference touch points. The map, in this case, is the contents of the ordered set path. Otherwise, the routine "match" returns false.

FIG. 10H provides a control-flow diagram for the routine "recursive match" called in step 1067 of FIG. 10G. The routine "recursive match" is quite similar to the routine "recursive row match," discussed above with reference to FIG. 10F. In step 1070, the routine "recursive match" receives the scan data, and the values of the variables row, num, and selected, that indicate the current row of the scan data that is being attempted to be matched, the number of row matches so far identified, and the set of already selected reference-scan rows, or touch points. In the for-loop of steps 1071-1079, each so-far unselected reference-scan row is attempted to be matched to the row of the scan data identified by the variable row. In step 1072, a call is made to the routine "row match" to determine whether or not the currently considered pair of rows matches. When the rows match, as determined in step 1073, then local copies are made of the variables, in step 1074, in preparation for a recursive call to the routine "recursive match" in step 1076. When the value of n_row is greater than the last row in the scan data, as determined in step 1075, then further recursion is not possible. In this case, when n_num is greater than the current value of max, as determined in step 1077, max is updated to the value of n_num and the global variable path is set to the current value of the selected ordered set, n_selected, to reflect the best mapping so far discovered. Otherwise, the recursive call to the routine "recursive match" is made in step 1076. Once all possible matches to the scan row have been considered in the for-loop of steps 1071-1079, a final matching path is considered in which the current scan row is not matched to a corresponding reference-scan row. The routines "match" and "recursive match," discussed above with reference to FIGS. 10G-H, carry out a tree-like recursive search through possible scan-touch-points-to-reference-scan-points mappings in order to find a best possible mapping between scan touch points and reference-scan touch points. The number of touch-point correspondences is returned as the match score, along with the ordered set path that indicates a mapping between scan touch points and reference-scan touch points. Thus, the results returned by the routines "match" and "recursive match" in FIGS. 10G-H are identical to the values returned by the first-implementation routine "match," discussed above with reference to FIGS. 10B-D. The routine "recursive match" may be implemented to include a recursion short circuit in the case that a very good mapping between scan touch points and reference-scan touch points has already been found, so that further exploration of possible mappings is no longer needed. The second matching-method implementation is also far more computationally efficient than the general methods discussed above with reference to FIGS. 7A-E, since only a subset of the total possible mappings is searched, without searching over translation and orientation dimensions.

The match score produced by either of the two above-discussed match implementations is but one of three factors that are considered in determining whether a scan matches a reference scan. The match score is the most important of the three factors and is the most heavily weighted. The other two factors include a tilt, or orientation factor, with regard to the orientation of the cell phone in space, as discussed above with reference to FIGS. 5A-B, and a factor that involves comparing the pressure, area, and other data for touch points, when available.

Figure 11A:
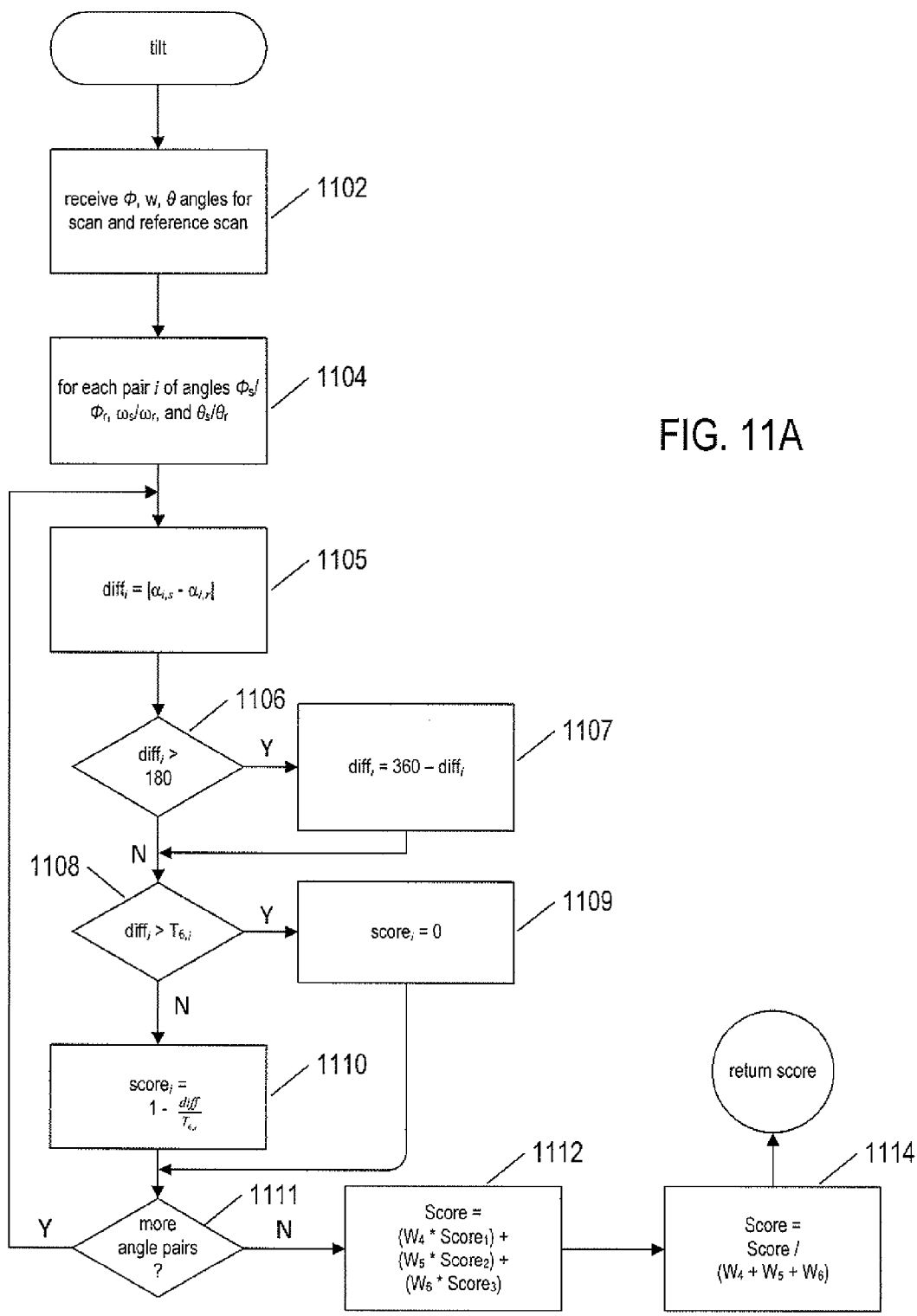
FIG. 11A provides a control-flow diagram for the routine "tilt," which produces a tilt score reflective of how well the cell-phone orientation observed during a scan matches the cell-phone orientation observed during a reference scan.

FIG. 11A provides a control-flow diagram for the routine "tilt," which produces a tilt score reflective of how well the cell-phone orientation observed during a scan matches the cell-phone orientation observed during a reference scan. In step 1102, the routine "tilt" receives the three angles, discussed above with reference to FIG. 5B, with both the scan and the reference scan. In the for-loop of steps 1104-1111, absolute value differences are computed between angles of each pair of corresponding angles to produce a score for each pair of corresponding angles. In step 1112, an overall tilt score is computed as the sum of weighted angle-pair scores and then, in step 1114, the computed score is normalized to fall between 0 and 1. In each iteration of the for-loop, the difference between the two angles of an angle pair is computed in step 1105. When the difference is greater than 180 degrees, as determined in step 1106, the difference is rendered into an equivalent difference in the range 0° to 180°, in step 1107. When the computed difference is greater than a threshold value for the angle-pair difference, as determined in step 1108, the score for the angle pair is set to 0, in step 1109. Otherwise, in step 1110, the score for the angle pair is computed as 1 minus the ratio of the computed difference to the threshold.

Figure 11B:
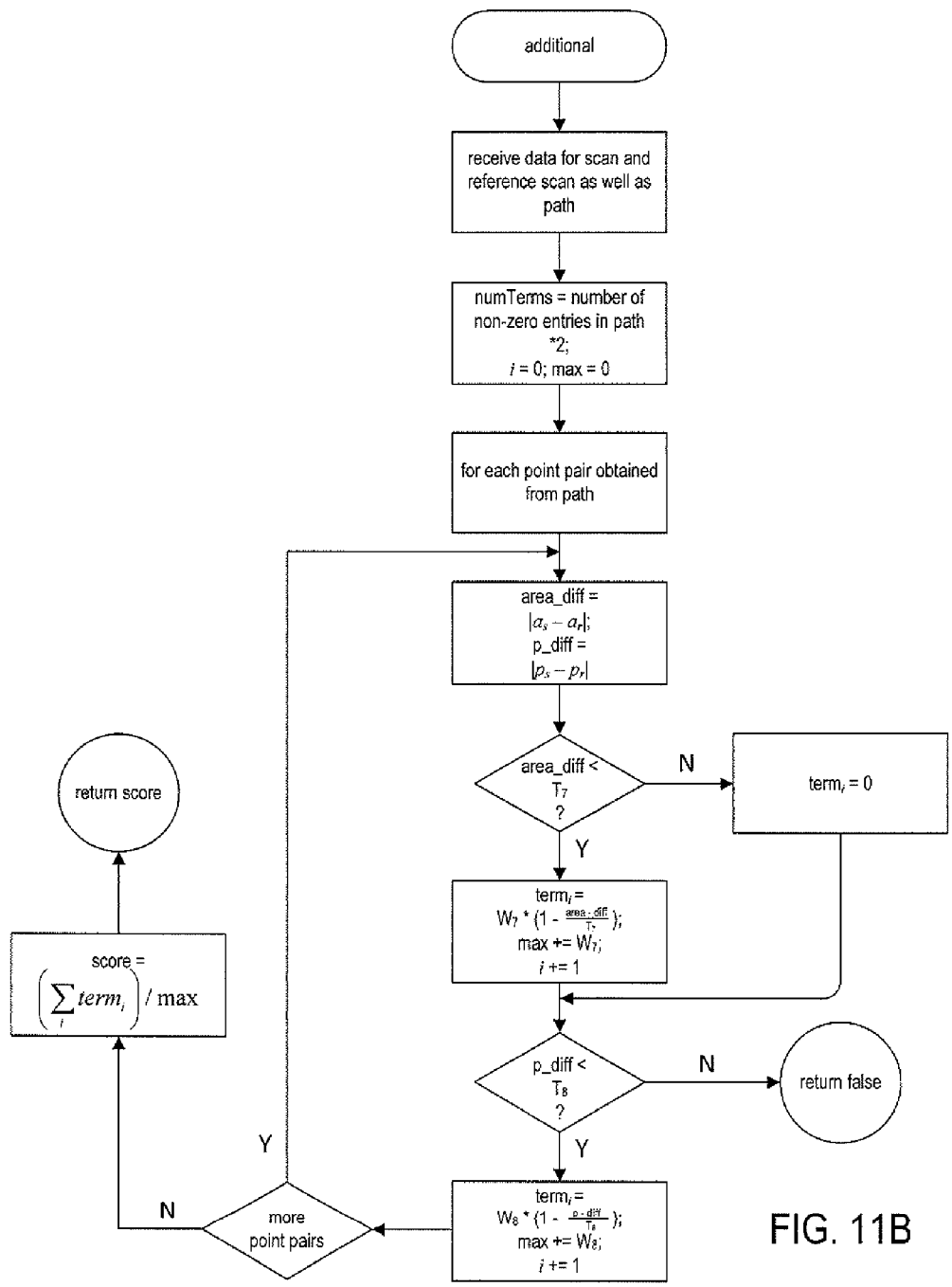
FIG. 11B provides a control-flow diagram for the routine "additional."

FIG. 11B provides a control-flow diagram for the routine "additional." This routine is very similar to the routine "tilt," described above with reference to FIG. 11A. The routine simply computes the sum of multiple terms, one term for each pressure and area value, and then computes an average difference over all of the pressure and area values. Because this routine is so similar to the routine "tilt," further discussion is not provided. The routine "additional" is easily expanded to include additional types of metrics or sensor data, when available.

Figure 11C:
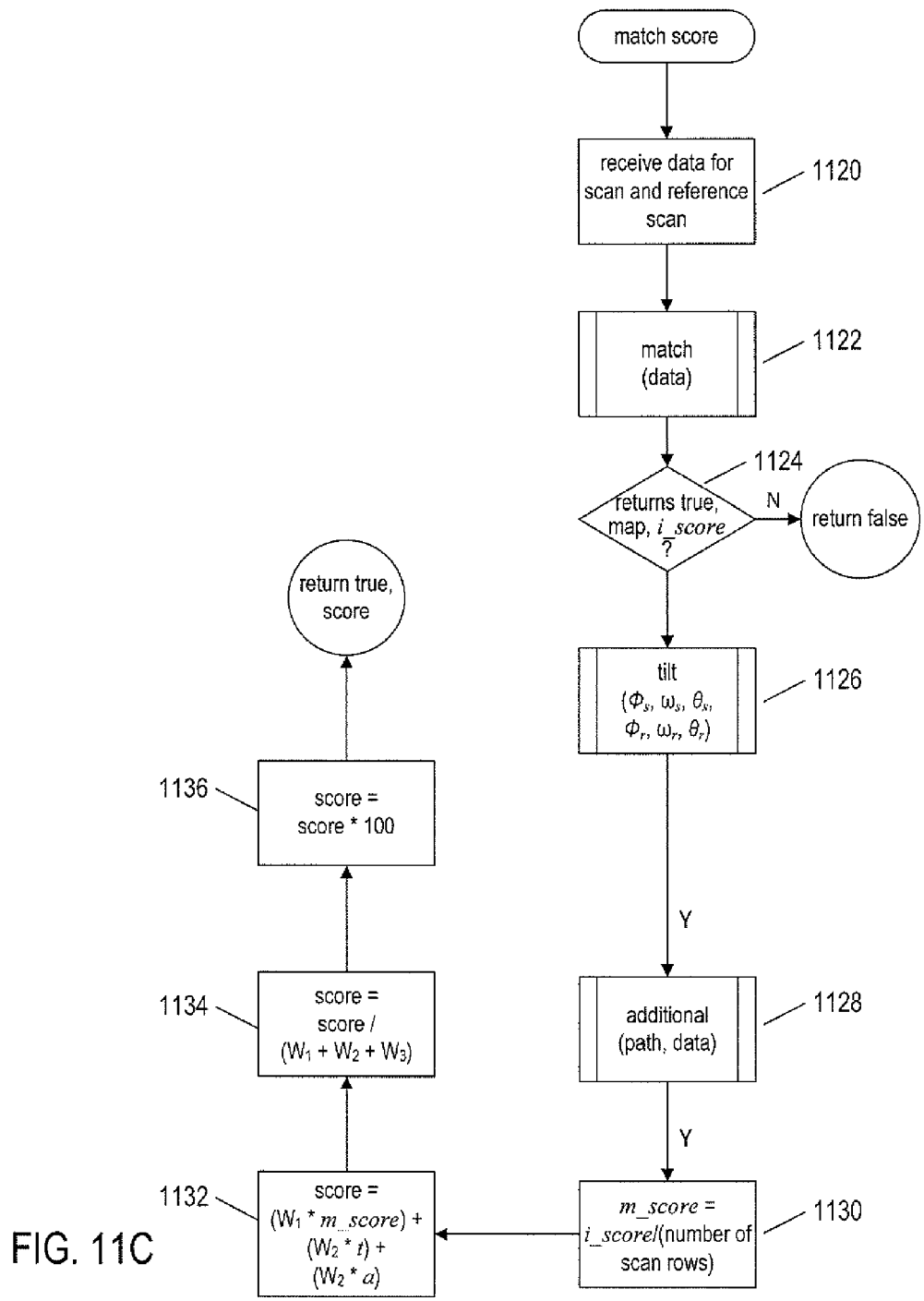
FIG. 11C provides a control-flow diagram for the routine "match score," which computes an overall matching score reflective of the comparison of the data-representation of a scan to the data representation of a reference scan.

FIG. 11C provides a control-flow diagram for the routine "match score," which computes an overall matching score reflective of the comparison of the data-representation of a scan to the data representation of a reference scan. In step 1120, data for the scan and the reference scan are received by the routine "match score." In step 1122, the routine "match" is called in order to determine how well the touch-point pattern of the scan can be correlated with the touch-point pattern of the reference scan, using either of the above-discussed two implementations for the matching routine or another alternative implementation that computationally efficiently identifies an optimal or near-optimal mapping between scan touch points and reference-scan touch points as well as a match score based on the mapping. When the routine "match" returns the value true, as determined in step 1124, then, in step 1126, the routine "tilt" is called to compute a tilt score t and the routine "additional" is called, in step 1128, to produce a score a for the pressure and area data. In step 1130, the score returned by the routine "match" is transformed into the value m_score that falls in the range 0 to 1. In step 1132, an aggregate score is computed as a sum of the weighted m_score, t, and a scores produced from the routine "match," "tilt," and "additional." In step 1134, the aggregate score is normalized to fall in the range [0,1] and then, in step 1136, the aggregate score is multiplied by 100 in order that the final score produced by the routine "match score" falls in the range [0,100].

FIG. 12 illustrates the data used to authenticate a computational-device user by the biometrics subsystem. The data includes a profile 1202 that includes multiple reference scans 1104-1108 and a scan acquired from the user during an authentication dialog 1110. The stored scan data representations that are referred to as "reference scans" are generally a subset of the total number of scans that may be stored in, or associated with, the profile. The profile is a dynamically evolving collection of scan data to which additional scans may be added, from which scans may be deleted, and the set of reference scans within which may changes, over time, to reflect a best set of mutually consistent scan information that provides optimal or near-optimal precision in matching new scans to the reference scans during authentication. There may be, in many cases, different reference scan sets used for different operations or functions carried out by the biometrics subsystem.

Figure 13A:
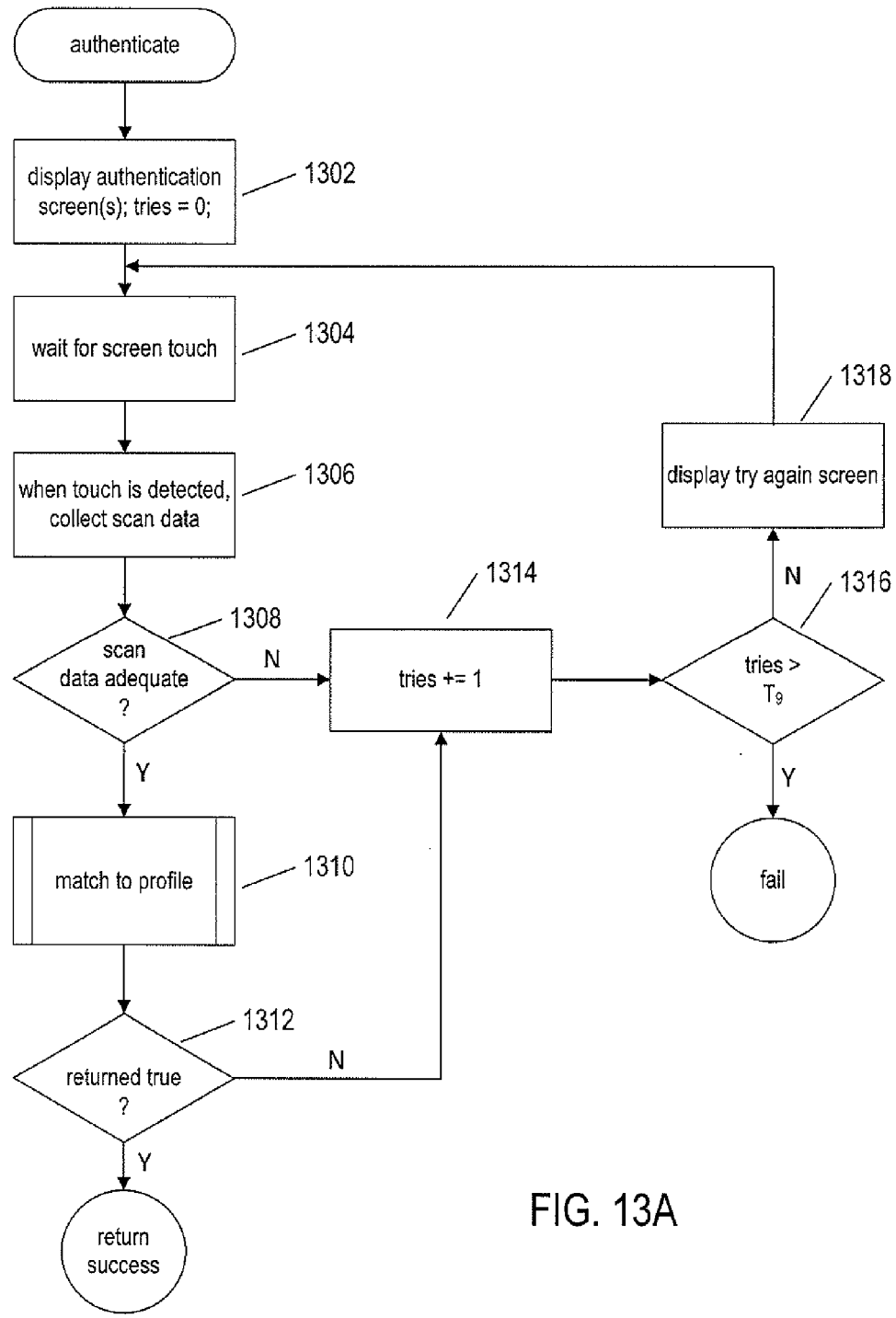
FIG. 13A illustrates the authentication method used by the biometric subsystem to authenticate a user based on ear scans.

FIG. 13A illustrates the authentication method used by the biometric subsystem to authenticate a user based on ear scans. In step 1302, the "authenticate" routine displays one or more authentication screens to prompt a user to attempt an ear scan with the user's device. The variables tries and failures are both set to 0. In step 1304, the routine "authenticate" waits for a screen touch. When a screen touch is detected, in step 1306, the routine "authenticate" obtains the scan data, discussed above with reference to FIGS. 6A-B, for a new ear scan from the device operating system. In step 1308, the routine "authenticate" determines whether the scan data is adequate. Scan data may need to have greater than a threshold number of touch points, for example, and may also need the largest area bounded by line segments connecting the touch points, when there are more than two touch points, to cover some minimal area of the touch screen. Other quality metrics can be applied to determine whether or not the scan is suitable for authentication purposes. When the scan is adequate, the "authenticate" routine calls the routine "match to profile," in step 1310. When this routine finds that the new scan matches the profile, the routine returns the value true, as a result of which the routine "authenticate" returns the value true. Otherwise, in the case that the match fails, as determined in step 1312, or the scan data was inadequate for authentication purposes, as determined in step 1308, control flows to step 1314 where the variable tries is incremented. When the variable tries exceeds a threshold value $T_9$, then the authentication routine fails. Otherwise, a try-again screen is displayed, in step 1318, to solicit another ear scan.

Figure 13B:
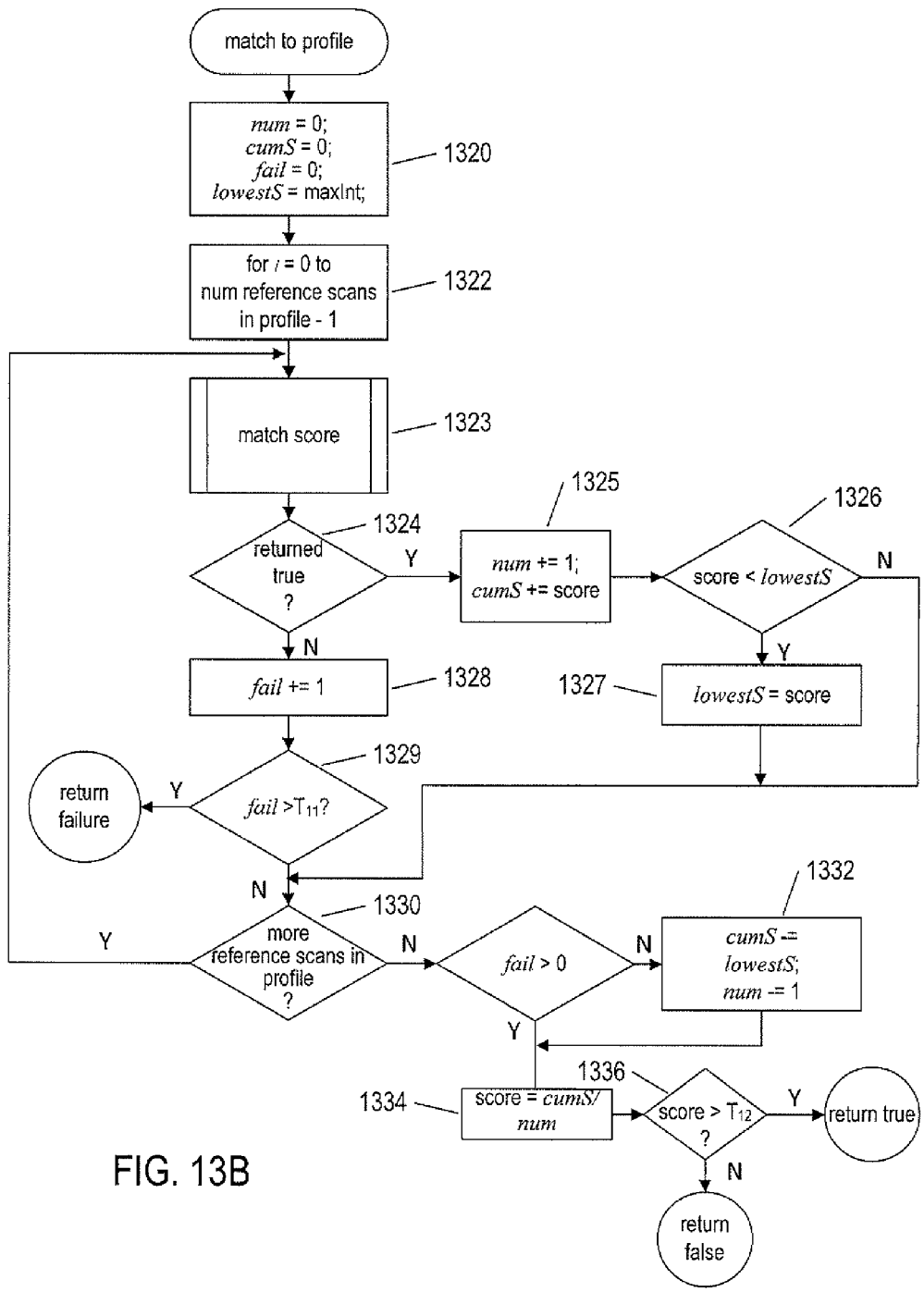
FIG. 13B provides a control-flow diagram for the routine "match to profile," called in step 1310 of FIG. 13A.

FIG. 13B provides a control-flow diagram for the routine "match to profile," called in step 1310 of FIG. 13A. In step 1320, local variables num, cumS, and fail are set to 0 and local variable lowestS is set to a large value. In the for-loop of steps 1322-1330, the newly obtained ear scan is compared to each reference scan in the profile (1202 in FIG. 12). The routine "match score" is called, in step 1323, to match the newly obtained scan to a next reference scan of the profile. When the scan matches the reference scan, as determined in step 1324, the variables num and cumS are incremented, in step 1325. When the score returned by the routine "match score" is smaller, in magnitude, then the value in variable lowestS, as determined in step 1326, then lowestS is set to that score in 1327 in order to keep track of the lowest match score observed during the matching process. When the new scan fails to match the reference scan, as determined in step 1324, the variable fail is incremented, in step 1328. When the variable fail contains a value greater than a threshold value $T_{11}$, as determined in step 1329, the routine "match to profile" returns failure. Once the new scan has been matched to all of the reference scans in the profile, when the value fail is 0, the lowest score is dropped from the aggregate score, in step 1332. A final score is computed as the ratio of cumS divided by num in step 1334. When the score is greater than a threshold $T_{12}$, as determined in step 1336, the routine "match to profile" returns true. Otherwise, the routine "match to profile" returns false.

Figure 14:
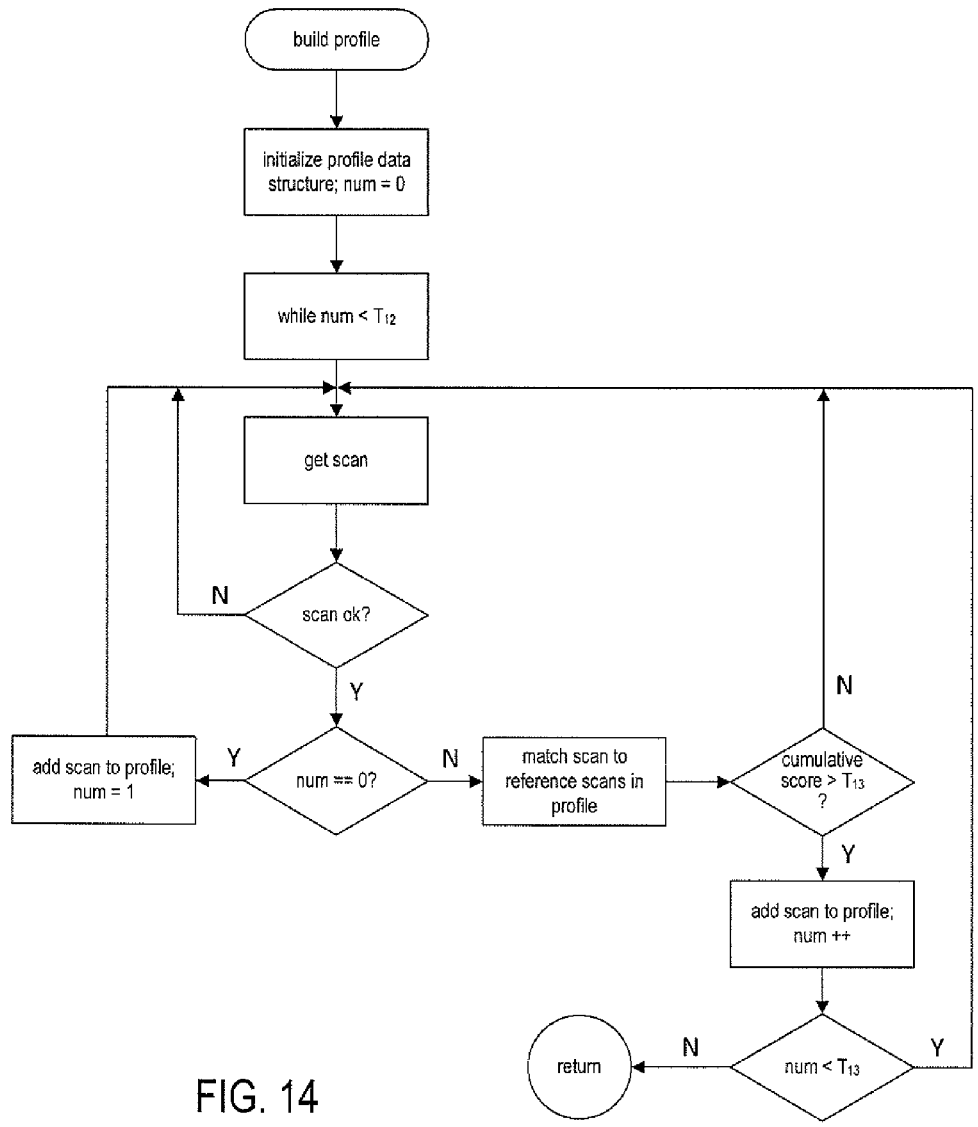
FIG. 14 provides a control-flow diagram for an example routine "build profile."

A profile is generally constructed by repeatedly acquiring ear scans from a user. Each new scan is compared to any reference scans already present in the profile and is only added to the profile when the new scan sufficiently closely matches the scans already present in the profile. FIG. 14 provides a control-flow diagram for an example routine "build profile." The biometrics subsystem may intermittently add scans to the profile and delete older sans from the profile in order to continue to improve the profile as a basis for user authentication.

Figure 15:
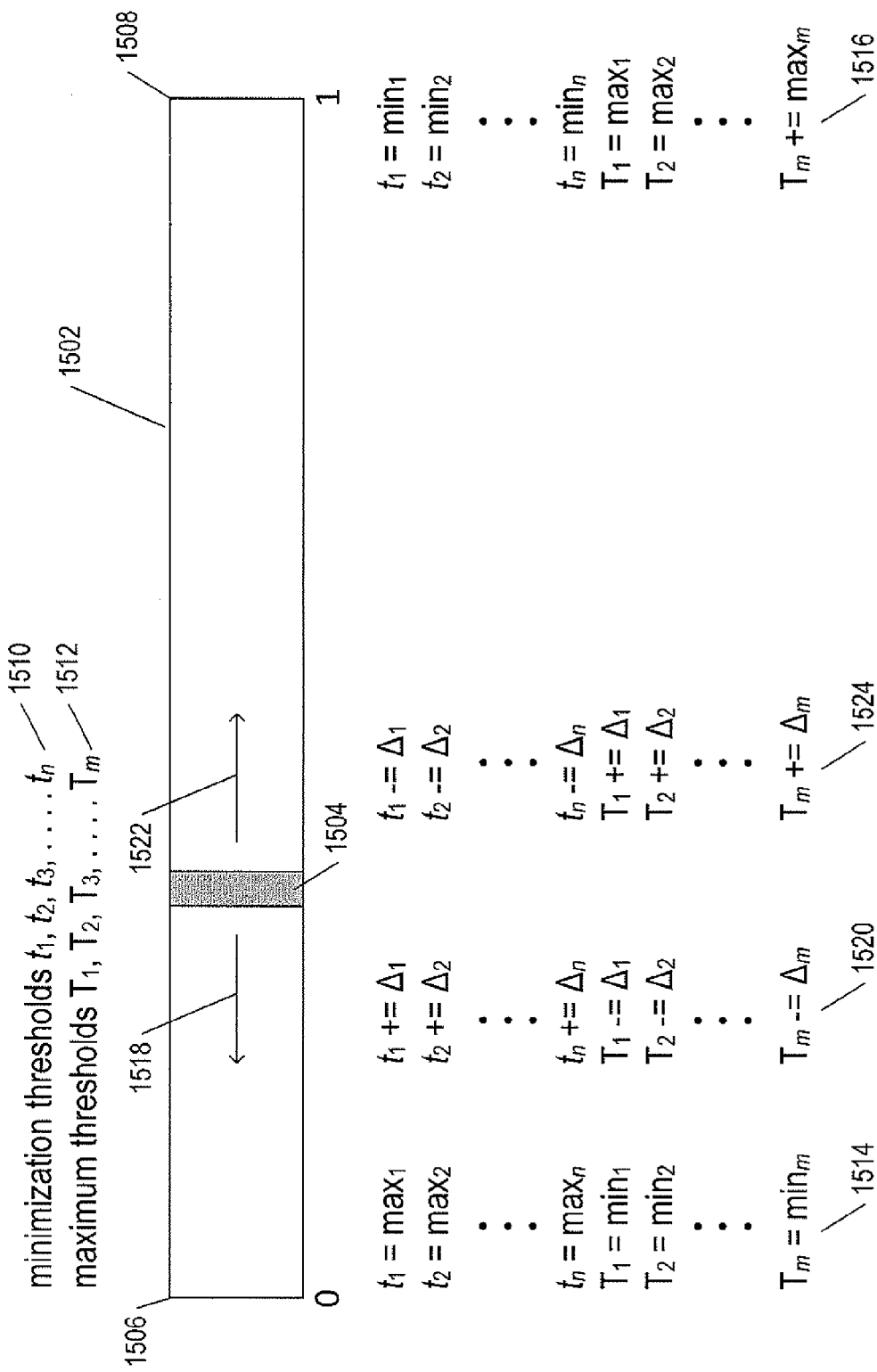
FIG. 15 illustrates one implementation of a user-sensitivity selection feature that allows a user to adjust how closely an ear scan needs to match a reference scans in a profile in order to result in finding of a match.

One particularly useful feature of the ear-scan-based biometric subsystem to which the current document is directed is that the subsystem allows users to select the rigor or sensitivity of the authentication process. FIG. 15 illustrates one implementation of a user-sensitivity selection feature that allows a user to adjust how closely an ear scan needs to match a reference scans in a profile in order to result in finding of a match. In the implementation shown in FIG. 15, a slider bar 1502 within which a slider 1504 is displayed. The user can move the slider, by touch control, anywhere along the slider bar 1502. The position of the slider bar indicates the sensitivity of the authentication process, with a position at the left end indicating the least sensitive and most permissive authentication and the position at the right end 1508 indicating the most sensitive and least permissive authentication. The change in the sensitivity of the authentication process is achieved by altering the values of the thresholds used during the authentication process, many of which are discussed above with reference to FIGS. 10A-13B. For purposes of illustration, it is assumed that there is a set of minimization thresholds 1510 and a set of maximization thresholds 1512. A minimization threshold is a threshold that a computed value must fall below in order for matching to occur or for values favorable to matching to be produced. A maximization threshold is a threshold that a computed value must exceed in order to facilitate an indication of matching. When the slider is at the left end of the slider bar 1506, the minimization thresholds have maximum values and the maximization thresholds have minimal values, as shown in column 1514. When the slider 1504 is at the right end of the slider bar 1508, the minimization thresholds have minimum values and maximization thresholds have maximum values, as indicated in column 1516. When the slider is moved to the left, as indicated by arrow 1518, the minimization thresholds are incremented and the maximization thresholds are decremented, as indicated by column 1520. When the slider 1504 is moved to the right, as indicated by arrow 1522, the minimization thresholds are decremented and the maximization thresholds are incremented, as indicated by column 1524. In certain implementations, there may be multiple slider bars that represent different collections of related thresholds. A user is thus provided an input feature, by the biometrics subsystem, to allow the user to adjust bow closely an ear scan must match the reference scans in a profile. The more rigorous the match requirements, the higher the probability that multiple ear scans will be necessary and the higher the probability that user carelessness during the authentication procedure will result in device lock out or denial to resource access.

Another particularly useful feature of the of the ear-scan-based biometric subsystem to which the current document is directed is that the authentication relies only on scan information locally stored in the processor-controlled device. There is no need for exchange of information with remote systems, thus eliminating communications-associated security risks and potential lockouts due to communications and remote-server problems.

Figure 16:
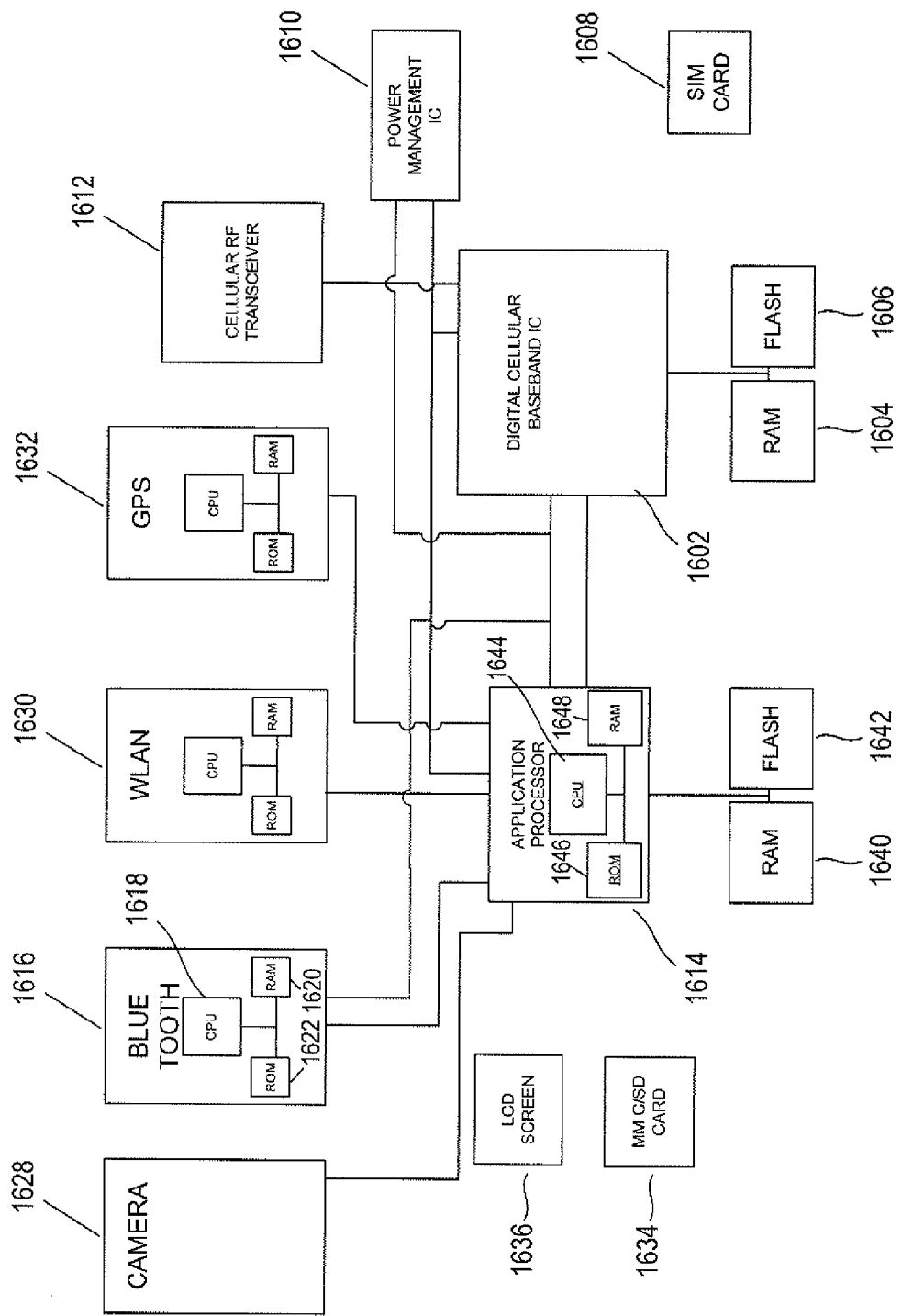
FIG. 16 provides a high-level block diagram of the internal components of a cell telephone handset.

FIG. 16 provides a high-level block diagram of the internal components of a cell telephone handset. These components include a dual-core digital cellular baseband integrated circuit 1602, which converts analog radio signals to digital signals and digital signals to analog signals, manages communications-protocol layers, and runs certain cell telephone applications and a portion of the user interface. The digital cellular baseband integrated circuit is interconnected with external RAM 1604 and flash 1606 memory, a subscriber identity module ("SIM"), or SIM card, 1608, a power-management integrated circuit 1610, the cellular RF transceiver 1612, a separate application processor integrated circuit 1614, and a Bluetooth module 1616 that includes a processor 1618 and both RAM 1620 and raw memory 1622. The application processor 1614 provides the computational bandwidth to a variety of non-radio-communications applications, including digital-camera-based applications, Internet browser, games, networking, the currently described biometrics subsystem, and GPS-related functions. An application processor may be connected to a video camera 1618, a WLAN module 1620, a GPS module 1622, an MMC/SD card 1624, and an LCD touch screen 1626. The application processor is additionally interconnected with external RAM 1630 and flash 1632 memory, and includes a processor 1634 and internal ROM 1636 and RAM memory.

Figure 17:
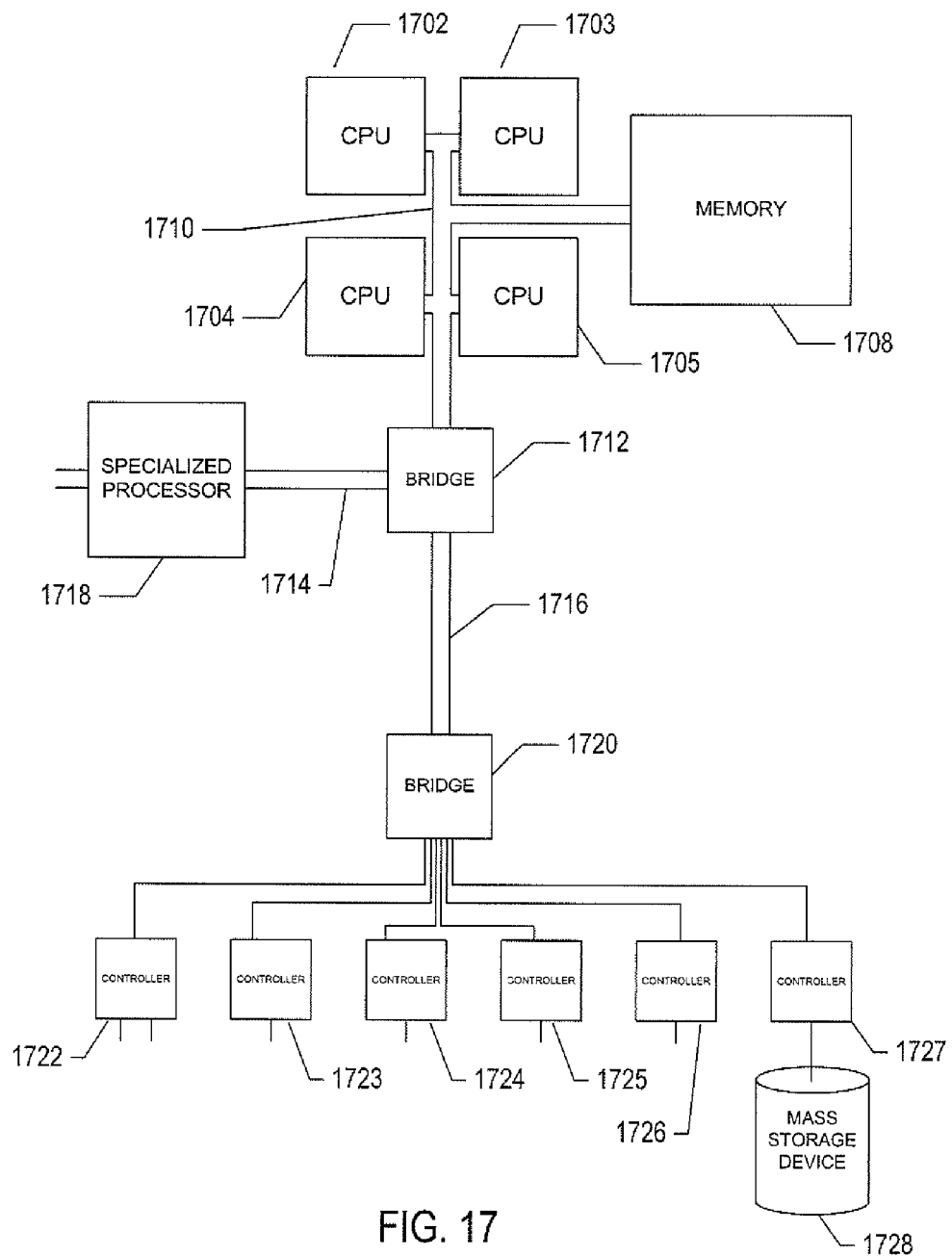
FIG. 17 provides a general architectural diagram for various types of computers and other processor-controlled devices.

FIG. 17 provides a general architectural diagram for various types of computers and other processor-controlled devices. The high-level architectural diagram may describe a modern computer system, such as tablet or laptop, in which the currently described biometrics subsystem controls access to the computer system, as a whole, or to components, subsystems, and resources within and provided by the computer system. The computer system contains one or multiple central processing units ("CPUs") 1702-1705, one or more electronic memories 1708 interconnected with the CPUs by a CPU/memory-subsystem bus 1710 or multiple busses, a first bridge 1712 that interconnects the CPU/memory-subsystem bus 1710 with additional busses 1714 and 1716, or other types of high-speed interconnection media, including multiple, high-speed serial interconnects. These busses or serial interconnections, in turn, connect the CPUs and memory with specialized processors, such as a graphics processor 1718, and with one or more additional bridges 1720, which are interconnected with high-speed serial links or with multiple controllers 1722-1727, such as controller 1727, that provide access to various different types of mass-storage devices 1728, electronic displays, input devices, and other such components, subcomponents, and computational resources.

It should be emphasized that the biometrics subsystem to which the current document is directed is neither an abstract idea or software. It is a subsystem of a cell phone, computer, or other processor-controlled device. The biometrics subsystem includes many electrical, electromechanical, mechanical, electro-optical, and electro-optico-mechanical components, many of which are multiplexed among multiple subsystems within a cell phone, computational device, or other processor-controlled device. The biometrics subsystem does include processor instructions that are stored in one or more of one or more electronic memories and mass-storage devices that, when executed by one or more processors, control the components to carry out ear scans, authentication, profile construction, and authentication-sensitivity adjustments.

Although the present invention has been described in terms of particular embodiments, it is not intended that the invention be limited to these embodiments. Modifications within the spirit of the invention will be apparent to those skilled in the art. For example, in of many different design and implementation parameters, including hardware platform, operating system, programming language, modular organization, data structures, control structures, and other such parameters may be varied to produce a variety of alternative implementations. Two scan-matching-method implementations are discussed, above, but additional implementations can be devised by using different limited searching methods to search the mapping, orientation, and translation space associated with matching one pattern of touch points with another. Additional types of sensor-collected information may be used to generate additional terms added to the final scan-match score used to determine whether or not two ear scans are sufficiently similar to constitute a match.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A biometrics subsystem that executes within a processor-controlled device, the biometrics subsystem including one or more touch-sensitive sensors, one or more acceleration sensors, and computational resources, including an electronic memory and processor bandwidth provided by one or more processors, and stored processor instructions that, when executed by one or more device processors, control the biometrics subsystem to:
   during an ear scan,
      collect touch-point position information from one or more touch-sensitive sensors that detect positions at which an ear contacts a touch-sensitive surface,
      collect device-orientation angles from an acceleration sensor, and
      store the collected touch-point position information and collected device-orientation angles as a first ear-scan data representation in an electronic memory; and
   authenticate a user by comparing the first ear-scan data representation to one or more reference-scan data representations, generating a match score for each comparison.

2. The biometrics subsystem of claim 1 wherein the touch-point position information comprises (x, y) coordinates for each touch point.

3. The biometrics subsystem of claim 1 wherein each ear-scan data representation additionally includes distance and direction information computed from pairs of touch-point positions.

4. The biometrics subsystem of claim 3 wherein the distance and direction information comprises a length and direction angle for at least one vector that connects each pair of touch points.

5. The biometrics subsystem of claim 1 further comprising a profile that includes a set of stored ear-scan data representations that together comprise a set of reference scans.

6. The biometrics subsystem of claim 5 wherein the biometrics subsystem authenticates a user by:
   soliciting an ear scan from the user;

receiving touch-point position information and device-orientation angles from sensors within the processor-controlled device;

storing the received touch-point position information and device-orientation angles in memory as a scan data representation;

for each reference scan within the profile,
comparing the scan data representation to the data representation of the reference scan to generate a match score;

computing an aggregate authentication score as the average of two or more of the generated match scores; and comparing the aggregate authentication score to an authentication threshold to determine whether or not the user's ear scan matches the profile.

7. The biometrics subsystem of claim 6 wherein comparing the scan data representation to the data representation of the reference scan to generate a match score further comprises:

determining a touch-point-pattern matching score that indicates how closely the touch-point pattern of the scan matches the reference-scan touch-point pattern;

determining an orientation matching score that indicates how closely the orientation of the processor-controlled device during acquisition of the scan matches the orientation of the processor-controlled device during acquisition of the reference scan; and computing the match score based on a weighted sum of the touch-point-pattern matching score and the orientation matching score.

8. The biometrics subsystem of claim 7 further including computing an additional matching score that indicates how closely additional sensor information collected during the scan matches corresponding additional information collected during the reference scan, the additional information including one or more of pressure and touch-point-area information, wherein the match score is computed as a weighted sum of the touch-point-pattern matching score, the orientation matching score, and additional matching score.

9. The biometrics subsystem of claim 1 wherein comparing a first ear-scan data representation to a second ear-scan data representation to generate a match score comprises:

determining a touch-point-pattern matching score;
determining an orientation matching score; and
computing the match score based on a weighted sum of the touch-point-pattern matching score and the orientation matching score.

10. The biometrics subsystem of claim 9 wherein determining a touch-point-pattern matching score comprises:

for each of the first ear-scan data representation and the second ear-scan data representation,
computing and storing, or accessing previously computed and stored, lengths and direction angles for each ordered pair of touch points, the length and direction angle for an ordered pair of touch points comprising one of the magnitude or directed distance of a vector pointing from the first touch point of the ordered pair of touch points to the second touch point of ordered pair of touch points and an angle between the vector and a reference vector;

computing a match table, each entry of which is indexed by a first index and a second index, each entry including a numerical indication of the likelihood of a correspondence between a touch point of the first ear-scan identified by the first index and a touch point of the second ear-scan;

for each touch point of the first ear scan, selecting a corresponding touch point of the second ear scan when the likelihood of a correspondence between the touch point of the first ear-scan and the touch point of the second ear-scan, as represented by the entry of the match table for the touch point of the first ear-scan and the touch point of the second ear-scan, is greater than the likelihood that the touch point of the second ear scan corresponds to another touch point of the first ear scan; and determining the touch-point-pattern matching score based on the number of second-ear-scan touch points identified as corresponding to first-ear-scan touch points.

11. The biometrics subsystem of claim 9 wherein determining a touch-point-pattern matching score comprises:

recursively searching a subset of the possible mappings between first-ear-scan touch points and second-ear-scan touch points to identify an optimal mapping within the subset of possible mappings; and determining the touch-point-pattern matching score based on the number of second-ear-scan touch points identified as corresponding to first-ear-scan touch points in the optimal mapping.

12. The biometrics subsystem of claim 9 wherein determining an orientation matching score comprises:

for each pair of corresponding orientation angles selected from the first ear-scan data representation and the second ear-scan data representation, computing a difference;

weighting the differences; and
generating the orientation matching score based on a sum of the weighted differences.

13. The biometrics subsystem of claim 9 further including computing an additional matching score that indicates how closely additional sensor information collected during the first ear scan matches corresponding additional information collected during the second ear scan, the additional information including one or more of pressure and touch-point-area information, wherein the match score is computed as a weighted sum of the touch-point-pattern matching score, the orientation matching score, and additional matching score.

14. A method, carried out by a biometrics subsystem that executes within a processor-controlled device, the biometrics subsystem including sensors and computational resources, including an electronic memory and processor bandwidth provided by one or more processors, and stored processor instructions that, when executed by one or more device processors, control the biometrics subsystem to carry out the method, the method comprising:

during an ear scan,
collecting touch-point position information from one or more touch-sensitive sensors that detect positions at which an ear contacts a touch-sensitive surface,
collecting device-orientation angles from an acceleration sensor, and
storing the collected touch-point position information and collected device-orientation angles as a first ear-scan data representation in an electronic memory; and authenticating a user by comparing a first ear-scan data representation to one or more reference-scan data representations, generating a match score for each comparison.

15. The method of claim 14 wherein the biometrics subsystem further comprises a profile that includes a set of stored ear-scan data representations that together comprise a set of reference scans.

16. The method of claim 15 wherein authenticating a user further includes:
 soliciting an ear scan from the user;
 receiving touch-point position information and device-orientation angles from sensors within the processor-controlled device;
 storing the received touch-point position information and device-orientation angles in memory as a scan data representation;
 for each reference scan within the profile,
  comparing the scan data representation to the data representation of the reference scan to generate a match score;
 computing an aggregate authentication score as the average of two or more of the generated match scores; and
 comparing the aggregate authentication score to an authentication threshold to determine whether or not the user's ear scan matches the profile.

17. The method of claim 16 wherein comparing the scan data representation to the data representation of the reference scan to generate a match score further comprises:
 determining a touch-point-pattern matching score that indicates how closely the touch-point pattern of the scan matches the reference-scan touch-point pattern;
 determining an orientation matching score that indicates how closely the orientation of the processor-controlled device during acquisition of the scan matches the orientation of the processor-controlled device during acquisition of the reference scan; and
 computing the match score based on a weighted sum of the touch-point-pattern matching score and the orientation matching score.

18. The method of claim 17 further including computing an additional matching score that indicates how closely additional sensor information collected during the scan matches corresponding additional information collected during the reference scan, the additional information including one or more of pressure and touch-point-area information,
 wherein the match score is computed as a weighted sum of the touch-point-pattern matching score, the orientation matching score, and additional matching score.

19. The method of claim 14 wherein comparing a first ear-scan data representation to a second ear-scan data representation to generate a match score comprises:
 determining a touch-point-pattern matching score;
 determining an orientation matching score; and
 computing the match score based on a weighted sum of the touch-point-pattern matching score and the orientation matching score.

20. The method of claim 19 wherein determining a touch-point-pattern matching score comprises:
 for each of the first ear-scan data representation and the second ear-scan data representation,
  computing and storing, or accessing previously computed and stored, lengths and direction angles for each ordered pair of touch points, the length and direction angle for an ordered pair of touch points comprising one of the magnitude or directed distance of a vector pointing from the first touch point of the ordered pair of touch points to the second touch point of ordered pair of touch points and an angle between the vector and a reference vector;
 computing a match table, each entry of which is indexed by a first index and a second index, each entry including a numerical indication of the likelihood of a correspondence between a touch point of the first ear-scan identified by the first index and a touch point of the second ear-scan;
 for each touch point of the first ear scan, selecting a corresponding touch point of the second ear scan when the likelihood of a correspondence between the touch point of the first ear-scan and the touch point of the second ear-scan, as represented by the entry of the match table for the touch point of the first ear-scan and the touch point of the second ear-scan, is greater than the likelihood that the touch point of the second ear scan corresponds to another touch point of the first ear scan; and
 determining the touch-point-pattern matching score based on the number of second-ear-scan touch points identified as corresponding to first-ear-scan touch points.

\* \* \* \* \*